United States Patent
Inaba et al.

(10) Patent No.: US 6,893,729 B2
(45) Date of Patent: May 17, 2005

(54) LAYERED RESIN MOLDING AND MULTILAYERED MOLDED ARTICLE

(75) Inventors: Takeshi Inaba, Settsu (JP); Taketo Kato, Settsu (JP); Shigehito Sagisaka, Settsu (JP); Takuya Arase, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 196 days.

(21) Appl. No.: 10/203,967

(22) PCT Filed: Feb. 19, 2001

(86) PCT No.: PCT/JP01/01174

§ 371 (c)(1),
(2), (4) Date: Nov. 1, 2002

(87) PCT Pub. No.: WO01/60606

PCT Pub. Date: Aug. 23, 2001

(65) Prior Publication Data

US 2003/0148125 A1 Aug. 7, 2003

(30) Foreign Application Priority Data

Feb. 18, 2000 (JP) .......................... 2000-41925

(51) Int. Cl.$^7$ .......................... B32B 27/08; B32B 27/30; C08L 77/00
(52) U.S. Cl. .................. 428/474.4; 428/34.1; 428/35.7; 428/36.9; 428/36.91; 428/220; 428/411.1; 428/421; 428/474.9; 428/475.8; 525/179
(58) Field of Search .......................... 428/474.4, 475.8, 428/220, 411.1, 421, 36.9, 36.91, 34.1, 35.7, 474.7, 474.9, 457, 458, 34.8, 179; 525/179

(56) References Cited

U.S. PATENT DOCUMENTS 5,554,426 A    9/1996  Röber et al.
5,789,529 A *  8/1998  Matsumura et al. ........ 528/170
5,795,939 A    8/1998  Lorek
5,891,538 A *  4/1999  Yamamoto et al. ........ 428/36.9
6,262,221 B1 * 7/2001  Palmer ..................... 528/310
6,416,832 B1 * 7/2002  Uehara et al. ............. 428/34.8
6,440,511 B1 * 8/2002  Shimizu et al. ............ 428/36.9
6,680,511 B2 * 1/2004  Kim et al. .................. 257/332

FOREIGN PATENT DOCUMENTS

| EP | 1 086 962 A1 | 3/2001 |
| JP | 5-8353 | 1/1993 |
| JP | 7-53823 | 2/1995 |
| JP | 10-311461 | 11/1998 |
| WO | WO 99-45044 | 9/1999 |

OTHER PUBLICATIONS

English translation of International Preliminary Examination Report for PCT/JP01/01174 Dated Mar. 1, 2002.

* cited by examiner

Primary Examiner—P. Hampton Hightower
(74) Attorney, Agent, or Firm—Sughrue Mion, PLLC

(57) ABSTRACT

The present invention is to provide a laminated resin molding comprising a polyamide-based resin composition as an outer layer and being excellent in interlayer adhesion strength, in particular a laminated resin molding comprising a fluorine-containing resin as an inner layer.

The present invention is a laminated resin molding which comprises a layer (A) comprising a polyamide-based resin composition and a layer (B) laminated to said layer (A), said layer (B) comprising a fluorine-containing ethylenic polymer having a carbonyl group, and said polyamide-based resin composition having a functional group, in addition to an amide group, selected from the group consisting of hydroxyl group, carboxyl group, ester group and sulfonamide group in a total amount of 0.05 to 80 equivalent percent relative to the amide group.

44 Claims, No Drawings

LAYERED RESIN MOLDING AND MULTILAYERED MOLDED ARTICLE

This is a National stage entry under 35 U.S.C. §371 of PCT/JP01/01174 filed Feb. 19, 2001, the disclosure of which is incorporated herein by reference.

TECHNICAL FIELD

The present invention relates to a laminated resin molding formed by laminating a polyamide-based resin composition and a fluorine-containing ethylenic polymer having carbonyl groups, in particular to such a laminated resin molding useful in such fields of application as transporting and storing a liquid agent capable of deteriorating polyamide-based resins, for example a solvent or fuel.

BACKGROUND ART

Laminated resin moldings formed by laminating a polyamide-based resin layer and a fluorine-containing ethylenic polymer layer are regarded to be suited for use as multilayer molded articles required to have mechanical properties and low permeability against liquid agents capable of deteriorating polyamide-based resins, for example solvents and fuels, thus suited for use as automotive fuel piping tubes or hoses or tanks. In particular, multilayer molded articles comprising a polyamide-based resin layer as an outer layer and a fluorine-containing ethylenic polymer layer as an inner layer, if necessary together with a further fluororesin layer on the inner layer side are expected to serve as composite materials having such fluorine-containing ethylenic polymer characteristics as heat resistance, oil and chemical resistance and low permeability against solvents and fuels, as well as such polyamide-based resin characteristics as high strength, high toughness, light weight, good processability and, in particular, flexibility. The term "liquid agents" as used herein for short means "liquid agents capable of deteriorating polyamide-based resins, for example solvents and fuels".

However, the polyamide-based resin layer and the layer comprising a fluororesin such as a fluorine-containing ethylenic polymer are generally low in interlayer adhesiveness. Therefore, attempts have so far been made to increase the interlayer adhesion strength. Thus, for example, Japanese Kokai Publication Hei-05-8353 discloses a multilayer tube comprising a polyamide resin as an outer layer and a fluororesin as an inner layer. In the gazette cited above, it is proposed that, for securing a certain level of adhesion strength between the polyamide resin layer and the fluororesin layer, crosslinking structures are introduced among molecules in both layers by irradiation. However, this technology cannot be applied to the coextrusion process, which is the usual technique of producing multilayer tubes, hoses or the like.

A technology has also been developed according to which the resin layer to be adhered to a polyamide-based resin is made of a blend with a fluororesin. Thus, for example, Japanese Kokai Publication Hei-07-53823 discloses a multilayer tube comprising a polyamide resin as an outer layer and a fluororesin as an inner layer, wherein a resin composition comprising both a specific polyamide resin and a fluorine-containing resin is laminated to the polyamide resin layer so that it may serve as an adhesive layer with the inner layer. When this method is used, however, the morphology of the adhesive layer changes according to the molding conditions due to the intrinsically poor compatibility between the constituent resins of the adhesive layer, namely the polyamide resin and fluorine-containing resin, and the morphology change influences on the cohesive force of the adhesive layer itself and on the adhesion strength thereof with the other layers. Accordingly, such problems arise as a tendency toward variation in adhesion strength according to environmental factors, such as molding conditions and temperature conditions during use, and difficulty in securing a constant quality level. In addition, this is not a technology to increase the adhesiveness of the polyamide-based resin and the fluororesin itself but one merely utilizing the adhesiveness of the polymer blend. The use of such polymer blend in lieu of the fluororesin results in an impairment in those excellent characteristics of the fluororesin.

To solve these problems, attempts have been made to improve fluororesin species themselves, and various fluororesin materials have been proposed. Thus, for example, the WO 99/45044 pamphlet discloses a laminate comprising a fluorine-containing ethylenic polymer having carbonate groups and/or carbonyl halide groups as a fluororesin to be laminated with the polyamide resin.

However, even when the initial interlayer adhesion strength between the polyamide-based resin and fluorine-containing ethylenic polymer is improved by these technologies, the decrease in adhesion strength with time, in particular the decrease in interlayer adhesion strength of the molded articles upon soaking with liquid agents capable of deteriorating polyamide-based resins, for example solvents and fuels, cannot be avoided. For example, it is a typical problem that the interlayer adhesion strength decreases in multilayer tubes in automotive fuel piping systems and, accordingly, the fuel permeability of the tubes increases with time. In this case, the cause is presumably that, in the condition of use in which multilayer tubes are in continuous soak with the automotive fuel, lower alcohols and like components contained in gasoline gradually permeate the fluororesin layer and, as a result, deteriorate the polyamide-based resin. Therefore, it is a matter of concern that the multilayer molded articles for use in transporting and storing liquid agents which are capable of deteriorating polyamide-based resins, for example solvents and fuels, should retain their interlayer adhesion strength. Further, it is necessary to effectively suppress the permeability in multilayer tubes and like moldings, in particular, to such solvents and fuels containing lower alcohols and like components.

Furthermore, even when such an improved fluorine-containing ethylenic polymer is used in combination with a commercially available polyamide-based resin, the mutual compatibility of the resins is insufficient, hence the cold temperature impact resistance is poor; thus, the use of a polyamide-based resin with a high plasticizer content is considered to raise a problem. Therefore, in producing multilayer tubes for automotive fuel piping, for instance, using such a combination, a polyamide-based resin with a high plasticizer content cannot be used as an outer layer so that the tubes must become hard; as a result, troubles arise in mounting the tubes on automobiles and the like. If a plasticizer-free polyamide-based resin is used, the resin pressure has to be increased, so that a problem arises that the molding speed (tube line speed) cannot be increased.

In view of the foregoing, there is a demand for laminated resin moldings which can impart to molded articles with good flexibility and mechanical properties as well as a high level of durability against heat, various chemical substances and other external environmental factors by providing a polyamide-based resin as an outer layer and which can markedly reduce in permeability against liquid agents capable of deteriorating polyamide-based resins, for example solvents and fuels, by providing a fluorine-containing resin layer as an innermost layer, in particular laminated resin moldings which can be molded by coextrusion molding and can produce such good multilayer molded articles in which the interlayer adhesion strength can be maintained over a prolonged period of time.

SUMMARY OF THE INVENTION

In view of the above-described state of the art, it is an object of the present invention to provide a laminated resin molding comprising a polyamide-based resin composition as an outer layer and being excellent in interlayer adhesion strength, in particular a laminated resin molding comprising a fluorine-containing resin as an inner layer and being suited for use in transporting and storing liquid agents capable of deteriorating polyamide-based resins, for example solvents and fuels.

As a result of intensive investigations to accomplish the above object, the present inventors found that when a polyamide-based resin composition having a certain amount of a specific functional group is used as one of the constituent layers and a specific fluorine-containing ethylenic polymer is laminated therewith, the interlayer adhesion strength between the polyamide-based resin composition layer and a fluorine-containing ethylenic polymer layer can be retained even after soaking with liquid agents capable of deteriorating polyamide-based resins, for example solvents and fuels, and, based on such finding, they have completed the present invention. Thus, the present invention relates to a laminated resin molding which comprises a layer (A) comprising a polyamide-based resin composition and a layer (B) laminated to said layer (A), said layer (B) comprising a fluorine-containing ethylenic polymer having a carbonyl group, and said polyamide-based resin composition having a functional group, in addition to an amide group, selected from the group consisting of hydroxyl group, carboxyl group, ester group and sulfonamide group in a total amount of 0.05 to 80 equivalent percent, preferably 1 to 70 equivalent percent, more preferably 1 to 50 equivalent percent, relative to the amide group.

In accordance with a preferred embodiment of the invention, the above polyamide-based resin composition may have the above functional group as a result of incorporation therein of a total amount of 5 to 30% by weight, relative to the whole polyamide-based resin composition, of a plasticizer having at least one functional group species selected from the group consisting of hydroxyl group, carboxyl group, ester group and sulfonamide group.

In a preferred embodiment of the invention, the above layer (B) is one formed by melt extrusion of a fluorine-containing ethylenic polymer having a carbonyl group, preferably a carbonate group and/or a carbonyl halide group, in a total amount of 3 to 1,000 groups per $1 \times 10^6$ main chain carbon atoms.

In one preferred embodiment of the invention, the above layer (B) contains an electrically conductive material, in another preferred embodiment, the above layer (B) is further laminated to a layer (C) which comprises a fluororesin and may contain an electrically conductive material or, the above layer (C) not containing the electrically conductive material is further laminated to a layer (D) which comprises a fluororesin and contains an electrically conductive material.

The present invention also relates to a laminated resin molding which comprises a layer (I) comprising a polyamide-based resin composition and a layer (II) laminated to said layer (I), said polyamide-based resin composition containing a plasticizer having at least one functional group species selected from the group consisting of hydroxyl group, carboxyl group, ester group and sulfonamide group, said layer (II) comprising a fluorine-containing ethylenic polymer having a carbonyl group, and a permeation rate of the molding against a liquid agent, in case that the liquid agent is soaked with the layer (II) side, being lower than a calculated permeation rate Pm defined by the following equation:

$$1/Pm = \Sigma(\Phi i/Pi)$$

in the formula, $\Phi i$ is a volume fraction of the $i^{th}$ layer of the laminated resin molding and Pi is the permeation rate of the resin layer constituting the $i^{th}$ layer of the laminated resin molding, when tested as a single-layer, against the liquid agent.

The present invention further relates to a method of reducing permeability, against a liquid agent, of a laminated resin molding comprising a layer (I) and a layer (II) laminated to said layer (I); which comprises incorporating, in said layer (I), a compound having high affinity for said liquid agent and capable of being prevented, by said layer (II), from migrating to said liquid agent, in which said layer (I) comprises a polyamide-based resin composition, and said layer (II) comprises a fluorine-containing ethylenic polymer, and relates to a production method of a laminated resin molding having low liquid agent permeability and comprising a layer (I) and a layer (II) laminated to said layer (I), which comprises incorporating, in a polyamide-based resin composition constituting said layer (I), a compound having high affinity for said liquid agent and capable of being prevented, by said layer (II), from migrating to said liquid agent and subjecting the resulting composition to lamination, in which said layer (I) comprises the polyamide-based resin composition, and said layer (II) comprises a fluorine-containing ethylenic polymer.

The invention further relates to a multilayer molded article which comprises the above laminated resin molding.

In a preferred embodiment, the above multilayer molded article includes a molded article selected from the group consisting of films, hoses, tubes, bottles and tanks, in particular an automotive fuel piping tube or hose or tank.

DETAILED DISCLOSURE OF THE INVENTION

In the following, the present invention is described in detail.

The laminated resin molding of the invention comprises a layer (A) comprising a polyamide-based resin composition and a layer (B) comprising a fluorine-containing ethylenic polymer having a carbonyl group, said layer (B) being laminated to the above layer (A) In the following, the polyamide-based resin composition and fluorine-containing ethylenic polymer which constitute those layers are first described one by one in detail.

Polyamide-Based Resin Composition

The polyamide-based resin so referred to herein means a crystalline macromolecule having the amide bond —NH—CO— in a repeating unit within the molecule. As such, there may be mentioned, for example, the so-called nylon resins, namely resins in which a majority of amide bonds are bound to an aliphatic or alicyclic structure. Specifically, there may be mentioned, for example, nylon 6, nylon 66, nylon 11, nylon 12, nylon 610, nylon 612, nylon 46, metaxylylenediamine/adipic acid polymers, nylon 6/66, and nylon 66/12, and blends of these.

The polyamide-based resin to be used in the practice of the invention may have a structure having no amide bond in a repeating unit as partially occurring within the polyamide-based resin in a block or graft form. As such resin, there may be mentioned the so-called polyamide resin elastomers such as nylon 6/polyester copolymers, nylon 6/polyether copolymers, nylon 12/polyester copolymers and nylon 12/polyether copolymers. These polyamide resin elastomers are block copolymers resulting from copolymerization of nylon resin oligomers and polyester resin oligomers or polyether resin oligomers by forming ester bonding or ether bonding. The above polyester resin oligomers include, for example, polycaprolactone and polyethylene adipate, and the polyether resin oligomers include, for example, polyethylene glycol, polypropylene glycol and polytetramethylene glycol. Particularly preferred embodiments are nylon 6/polytetramethylene glycol copolymers and nylon 12/polytetramethylene glycol copolymers.

In the practice of the present invention, the polyamide-based resin is preferably selected from among appropriate species having a melting point of not lower than 130° C. When the melting point is lower than 130° C., the layer formed therefrom may be poor in mechanical properties, heat resistance or the like. Preferably, it is 150 to 300° C., more preferably 150 to 270° C.

For use in extrusion molding or blow molding in the practice of the invention, the polyamide-based resin preferably has a relative viscosity, which indicates a molecular weight, of not less than 1.8, more preferably not less than 2.0. When it is less than 1.8, the resin may show poor moldability in the step of molding and resulting molded articles may be inferior in mechanical properties. On the other hand, the upper limit is preferably not more than 4.0. If it exceeds 4.0, the polymerization of the resin itself is difficult and, even if the resin is obtained, the resin may be poor in moldability in the step of the above-mentioned molding. The above-mentioned relative viscosity is determined as described in JIS K 6810.

Preferred as the polyamide-based resin to be used in the practice of the invention are nylon 6, nylon 66, nylon 11, nylon 12, nylon 610, nylon 612, nylon 6/66, nylon 66/12, nylon 6/polyester copolymers, nylon 6/polyether copolymers, nylon 12/polyester copolymers, nylon 12/polyether copolymers, and blends of these. In cases where toughness is required as in the case of using it in producing molded tubes, hoses or like moldings, those resins which contain, as a main component (not less than 50% by weight), nylon 11, nylon 12, nylon 610, nylon 612, nylon 6/polyether copolymers and nylon 12/polyether copolymers can appropriately be used. Among these, nylon 11, nylon 12 and nylon 612 are more preferred.

In the practice of the invention, the above polyamide-based resin has a functional group or groups, in addition to an amide group, selected from the group consisting of hydroxyl group, carboxyl group, ester group and sulfonamide group in a total amount of 0.05 to 80 equivalent percent relative to the amide group. Namely, only when it has one or more species of hydroxyl group, carboxyl group, ester group or sulfonamide group in a total amount such that the above condition relative to the amide group may be satisfied, the characteristics of the interlayer adhesion strength can be maintained over a prolonged period of time without the initial characteristics thereof being impaired. Therefore, if the total amount of the functional groups mentioned above is less than 0.05 equivalent percent, the interlayer adhesion strength between the layer (A) comprising the polyamide-based resin composition and the layer (B) comprising the fluorine-containing ethylenic polymer having the carbonyl group will decrease with time and the permeability against a liquid agent will increase when the molding is kept soaked with the liquid agent for a long period. When, conversely, the total amount exceeds 80 equivalent percent, the mechanical properties, heat resistance, chemical resistance and the like, which are required of polyamide-based resin compositions, may not be manifested to a satisfactory extent or the plasticizer or the like component having such functional groups may bleed out of the polyamide-based resins with time. The total amount of the above functional group other than the amide group is preferably 1 to 70 equivalent percent, more preferably 1 to 50 equivalent percent, relative to the amide group.

The method of incorporating the above functional group in a polyamide-based resin composition is not particularly restricted but may comprise copolymerizing a copolymerizable monomer having such a functional group or groups with the polyamide-based resin, or incorporating a plasticizer having at least one functional group selected from the group consisting of hydroxyl group, carboxyl group, ester group and sulfonamide group or a macromolecule having such a functional group(s) and compatible with the polyamide-based resin so that the above-mentioned functional group content may be attained. The above-mentioned macromolecule containing the functional group and being compatible with the polyamide-based resin includes, for example, ester- and/or carboxylic acid-modified olefinic resins (ethylene/methyl acrylate copolymers, ethylene/acrylate copolymers, ethylene/methyl acrylate/maleic anhydride copolymers, ethylene/ethyl acrylate copolymers, propylene/maleic anhydride copolymers, etc.), ionomer resins, polyester resins, phenoxy resins, ethylene-propylene-diene copolymers, and polyphenylene oxide. The polyamide-based resin having a functional group(s) as mentioned above may also be incorporated.

Among them, the method comprising incorporating a plasticizer is advantageous in that not only the desired amount of the above-mentioned functional group(s) can be incorporated at a relatively low addition level but also the effects intrinsic in the plasticizer can render the resin composition flexible and improve the cold temperature mechanical properties of tubes or hoses, in particular. In this case, the addition level may vary depending on the plasticizer species. Generally, however, the above functional group content can be attained at an addition level of about 5 to 30% by weight relative to the whole amount of the composition. Preferably, the plasticizer is incorporated in an amount of 5 to 20% by weight relative to the whole amount of the composition.

As such plasticizer, there may be mentioned, for example, alcoholic hydroxyl group-containing compounds such as hexylene glycol and glycerol; phenolic hydroxyl group-containing compounds such as β-naphthol, dibenzylphenol, octylcresol, bisphenol A and like bisphenol compounds, octyl p-hydroxybenzoate, 2-ethylhexyl p-hydroxybenzoate and heptyl p-hydroxybenzoate; carboxyl group-containing compounds such as p-hydroxybenzoic acid-ethylene oxide and/or propylene oxide adducts; ester group-containing compounds such as octyl p-hydroxybenzoate, 2-ethylhexyl p-hydroxybenzoate, heptyl p-hydroxybenzoate and like benzoate esters and, further, ε-caprolactone, phosphate esters of phenolic compounds, and the like; and sulfonamide group-containing compounds such as N-methylbenzenesulfonamide, N-ethylbenzenesulfonamide, N-butylbenzenesulfonamide, toluenesulfonamide, N-ethyltoluenesulfonamide and N-cyclohexyltoluenesulfonamide.

In this case, the amine value of the polyamide-based resin in which the plasticizer is to be incorporated is not particularly restricted. In the case of ordinary polyamide resins, the value is generally less than 10 equivalents/$10^6$ g, and such polyamide resins can be used. Polyamide resins having a greater amine value than the above value, for example 10 to 60 equivalents/$10^6$ g, can also be used, however. Meanwhile, from the viewpoint of molecular weight or adhesion strength, the polyamide-based resin preferably has an acid value not higher than 80 equivalents/$10^6$ g.

In the practice of the invention, a sulfonamide group is preferred among the functional groups mentioned above, in particular it is preferred that a sulfonamide group directly bound to an aromatic ring is contained. In particular when such a plasticizer or a compatible macromolecule as mentioned above is used, a component having a sulfonamide group, in particular a component having a sulfonamide group directly bound to an aromatic ring is preferred since when incorporated in polyamide-based resin compositions, it takes its effect at a low addition level and, in addition, it has an advantage that the possibility of its bleeding out is low even in the case of long-term use, due to the excellent compatibility with polyamide-based resin compositions.

In the practice of the present invention, the polyamide-based resin composition may contain another resin, a colorant and/or various additives unless the object of the invention is deteriorated. As the additives, there may be mentioned, for example, antistatic agents, flame retardants, heat stabilizers, ultraviolet absorbers, lubricants, mold-release agents, nucleating agents, and reinforcing agents (fillers).

In the practice of the invention, the above polyamide-based resin composition comprises the polyamide-based resin described above and the above various components incorporated according to need.

Fluorine-Containing Ethylenic Polymer having a Carbonyl Group

The fluorine-containing ethylenic polymer having a carbonyl group to be used in accordance with the present invention is hereinafter sometimes referred to as a "fluorine-containing ethylenic polymer according to the invention". The term "carbonyl group" as used herein means a functional group having —C(=O)— essentially reactive with such functional groups as amide group or amino group in the polyamide-based resin composition constituting the above layer (A). More specifically, it includes carbonate, carbonyl halide, aldehyde, ketone, carboxyl, ester, acid anhydride, isocyanate and the like. On the contrary, amide, imide, urethane, urea and the like, in spite of their having —C(=O)—, are poor in reactivity as compared with the carbonate group and other functional groups mentioned above and cannot provide a sufficient level of adhesion strength with the layer (A) comprising the polyamide-based resin composition, hence may be said to be essentially incapable of reacting with the functional groups in the polyamide-based resin composition constituting the above layer (A). Thus, the term carbonyl group as used herein does not include at least the amide, imide, urethane or urea group. Preferred as the above carbonyl group in the practice of the invention are the carbonate group, carbonyl halide group, carboxylate salt, ester group and acid anhydride group, which can be introduced with ease and are highly reactive with the polyamide-based resin.

The number of carbonyl groups in the fluorine-containing ethylenic polymer according to the invention may appropriately be selected according to the species and the shape of the other material to be laminated, the object of adhesion, the use, the adhesion strength required, the shape of said polymer, the method of adhesion, and the like. It is preferred, however, that the number of carbonyl groups be 3 to 1,000, in total, per $1\times10^6$ main chain carbon atoms. When the number of carbonyl groups per $1\times10^6$ main chain carbon atoms is less than 3, a sufficient adhesion strength may not be attained. When it exceeds 1,000, the adhesion strength may be reduced as a result of chemical modification of the carbonyl groups in the step of adhesion. More preferably, the number is 3 to 500, still more preferably 3 to 300, particularly preferably 5 to 150. The carbonyl group content in the fluorine-containing ethylenic polymer can be determined by infrared absorption spectrophotometry.

Where 10 or more, more preferably 20 or more, carbonyl halide groups per $1\times10^6$ main chain carbon atoms, which are particularly excellent in reactivity with polyamide-based resin compositions, are present in the fluorine-containing ethylenic polymer, good adhesion performance to the layer (A) comprising the polyamide-based resin composition can be attained even when the total carbonyl group content is less than 150 per $1\times10^6$ main chain carbon atoms.

When the fluorine-containing ethylenic polymer described above is heated, for instance, in the step of molding, or with the lapse of time, the carbonyl halide groups may be decomposed to form carboxylic acid. Therefore, when the fluorine-containing ethylenic polymer in said layer (B) of the resin laminate has a carbonate group and/or a carbonyl halide group, it is generally to be understood that the polymer also has a carboxyl group derived from these.

The carbonate groups in the fluorine-containing ethylenic polymer according to the invention are groups generally having the bonding —OC(=O)O— and specifically have a structure of —OC(=O)O—R (wherein R is an organic group (e.g. $C_1$–$C_{20}$ alkyl group (in particular $C_1$–$C_{10}$ alkyl group), an ether bond-containing $C_2$–$C_{20}$ alkyl group or the like) or a group VII element). As preferred examples of the carbonate group, there may be mentioned —OC(=O)OCH$_3$, —OC(=O)OC$_3$H$_7$, —OC(=O)OC$_8$H$_{17}$, —OC(=O)OCH$_2$CH$_2$CH$_2$OCH$_2$CH$_3$ and the like.

The carbonyl halide groups in the fluorine-containing ethylenic polymer according to the invention specifically have a structure of —COY (wherein Y is a halogen element), and examples are —COF and —COCl.

The fluorine-containing ethylenic polymer having such carbonyl groups itself can retain those excellent characteristics which fluorine-containing materials have, such as chemical resistance, solvent resistance, weathering resistance, and antifouling and non-stick properties, and can provide the molded laminate with such excellent characteristics of fluorine-containing material without deterioration thereof.

The fluorine-containing ethylenic polymer according to the invention has carbonyl groups within the polymer chain thereof. The mode in which the carbonyl groups are contained in the polymer chain is not particularly restricted but, for example, carbonyl groups may be bound to the polymer chain termini or polymer side chains. Among them, polymers having carbonyl groups at polymer chain termini are preferred since they will not markedly reduce the heat resistance, mechanical properties and chemical resistance or since they are advantageous from the viewpoint of productivity and cost. A method of introducing carbonyl groups into polymer chain termini using a polymerization initiator having a carbonyl group(s) or a functional group(s) convertible to a carbonyl group(s), for example a peroxy carbonate or peroxy ester is a preferred embodiment since introduction can be realized very easily and the content of carbonyl groups introduced can be controlled with ease. The carbonyl group derived from a peroxide so referred to herein means a carbonyl group directly or indirectly derived from a functional group contained in a peroxide.

Even when a fluorine-containing ethylenic polymer having no carbonyl groups is contained in the fluorine-containing ethylenic polymer according to the invention, the only requirement is that the total number of carbonyl groups per $1 \times 10^6$ main chain carbon atoms on the whole polymer basis should be within the range described above.

The species and structure of the fluorine-containing ethylenic polymer according to the invention can appropriately be selected according to the purpose of the use, application and method of use. Among others, those having a melting point of 160 to 270° C. are preferred, however, and such polymers, particularly when used for lamination by heating/melting and adhesion operation with other material, can fully show the adhesion performance of carbonyl groups and can advantageously provide firm adhesion strength, in particular, when laminated directly with the other material. For enabling lamination also with an organic material having relatively low heat resistance, the melting point is more preferably not higher than 230° C., still more preferably not higher than 210° C.

The fluorine-containing ethylenic polymer according to the invention preferably has a molecular weight within such a range that the polymer can be molded at temperatures below the heat decomposition point and that the moldings obtained can display those excellent mechanical properties, chemical resistance and other properties which are intrinsic in the fluorine-containing ethylenic polymer. More specifically, when the melt flow rate (MFR) is taken as an index of molecular weight, the MFR at an arbitrary temperature within the range of about 230 to 350° C., which is a temperature range generally used in molding fluororesins, is preferably 0.5 to 100 g/10 minutes.

The fluorine-containing ethylenic polymer according to the invention comprises a fluorine-containing ethylenic polymer chain and a carbonyl group(s) bound thereto. Structurally, the above polymer chain is generally a homopolymer or copolymer chain having a repeating unit derived from at least one fluorine-containing ethylenic monomer species, and it may be a polymer chain resulting from polymerization of a fluorine-containing ethylenic monomer(s) or polymerization of a fluorine-containing ethylenic monomer(s) and a fluorine atom-free ethylenic monomer(s).

The above-described fluorine-containing ethylenic monomer is a fluorine atom-containing, olefinically unsaturated monomer and specifically includes tetrafluoroethylene, vinylidene fluoride, chlorotrifluoroethylene, vinyl fluoride, hexafluoropropylene, hexafluoroisobutene, monomers represented by the formula (ii):

$$CH_2=CX^1(CF_2)_nX^2 \qquad (ii)$$

in the formula, $X^1$ is H or F, $X^2$ is H, F or Cl and n is an integer of 1 to 10, perfluoro(alkyl vinyl ether) species and the like.

The above-described fluorine atom-free ethylenic monomer is preferably selected from ethylenic monomers containing not more than 5 carbon atoms so that the heat resistance, chemical resistance and like characteristics may not be deteriorated. Specifically, there may be mentioned ethylene, propylene, 1-butene, 2-butene, vinyl chloride, vinylidene chloride, etc.

In cases where a fluorine-containing ethylenic monomer(s) and a fluorine atom-free ethylenic monomer(s) are used, the monomer composition may have a ratio of 10 to 100 mole percent (e.g. 30 to 100 mole percent) of the fluorine-containing ethylenic monomer(s) to 0 to 90 mole percent (e.g. 0 to 70 mole percent) of the fluorine atom-free ethylenic monomer(s).

By selecting the fluorine-containing ethylenic monomer species and fluorine atom-free ethylenic monomer species, and the combination and composition ratio thereof, etc., the melting point or glass transition point of the fluorine-containing ethylenic polymer according to the invention can be adjusted and the polymer may be either resin-like or elastomer-like. The form and properties of the fluorine-containing ethylenic polymer can appropriately be selected according to the object and application field of adhesion and to the object and application field of the laminate.

Preferred as the fluorine-containing ethylenic polymer according to the invention is a fluorine-containing ethylenic polymer having a carbonyl group and comprising the tetrafluoroethylene unit from the viewpoint of heat resistance and chemical resistance, or, from the viewpoint of moldability/workability, a fluorine-containing ethylenic copolymer having a carbonyl group and comprising the vinylidene fluoride unit.

As preferred typical examples of the fluorine-containing ethylenic polymer according to the invention, there may be mentioned fluorine-containing ethylenic copolymers (I) to (V) each having a carbonyl group and essentially resulting from polymerization of the monomers mentioned below:

(I) copolymers resulting from polymerization of at least tetrafluoroethylene and ethylene;

(II) copolymers resulting from polymerization of at least tetrafluoroethylene and a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms;

(III) copolymers resulting from polymerization of at least vinylidene fluoride;

(IV) copolymers resulting from polymerization of at least the following a, b and c:

a. 20 to 90 mole percent, preferably 20 to 70 mole percent, of tetrafluoroethylene;

b. 10 to 80 mole percent, preferably 20 to 60 mole percent, of ethylene;

c. 1 to 70 mole percent, preferably 1 to 60 mole percent, of a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms; and (V) copolymers resulting from polymerization of at least the following d, e and f:

d. 15 to 60 mole percent of vinylidene fluoride;

e. 35 to 80 mole percent of tetrafluoroethylene;

f. 5 to 30 mole percent of hexafluoropropylene.

The fluorine-containing ethylenic polymers having the carbonyl group specifically mentioned above are all preferred in view of their good heat resistance, chemical resistance, weathering resistance, electrical insulating and non-stick properties.

As the above copolymers (I), there may be mentioned, for example, carbonyl group-containing copolymers comprising 20 to 90 mole percent (e.g. 20 to 70 mole percent) of the tetrafluoroethylene unit, 10 to 80 mole percent (e.g. 20 to 60 mole percent) of the ethylene unit and 0 to 70 mole percent of the unit derived from a monomer copolymerizable with these, relative to the whole monomer units except for the carbonyl group-containing monomer, when the polymer has a carbonyl group(s) on its side chain(s).

The copolymerizable monomer mentioned above includes hexafluoropropylene, chlorotrifluoroethylene, monomers represented by the formula (ii):

$$CH_2=CX^1(CF_2)_nX^2 \qquad (ii)$$

in the formula, $X^1$ is H or F, $X^2$ is H, F or Cl and n is an integer of 1 to 10,
perfluoro(alkyl vinyl ether) species, propylene and the like. One or more of these are generally used.

Such fluorine-containing ethylenic polymers are preferred because of their good heat resistance, chemical resistance, weathering resistance, electrical insulating and non-stick properties, in particular.

Preferred among these are the following:

(I-1) carbonyl group-containing copolymers having a polymer chain comprising 62 to 80 mole percent of the tetrafluoroethylene unit, 20 to 38 mole percent of the ethylene unit and 0 to 10 mole percent of the unit derived from another monomer; and (I-2) carbonyl group-containing copolymers having a polymer chain comprising 20 to 80 mole percent of the tetrafluoroethylene unit, 10 to 80 mole percent of the ethylene unit, 0 to 30 mole percent of the hexafluoropropylene unit and 0 to 10 mole percent of the unit derived from another monomer. These copolymers retain the excellent performance characteristics of tetrafluoroethylene/ethylene copolymers, can have a relatively low melting point and can maximally exhibit their adhesiveness to other materials, hence are preferred.

Preferred as the above-mentioned copolymer (II) are, for example, (II-1) carbonyl group-containing copolymers having a polymer chain comprising 65 to 95 mole percent, preferably 75 to 95 mole percent, of the tetrafluoroethylene unit and 5 to 35 mole percent, preferably 5 to 25 mole percent, of the hexafluoropropylene unit;

(II-2) carbonyl group-containing copolymers having a polymer chain comprising 70 to 97 mole percent of the tetrafluoroethylene unit and 3 to 30 mole percent of the $CF_2=CF-ORf^2$ unit (wherein $Rf^2$ is a perfluoroalkyl group containing 1 to 5 carbon atoms); and (II-3) carbonyl group-containing copolymers having a polymer chain comprising the tetrafluoroethylene unit, hexafluoropropylene unit and the $CF_2=CF-ORf^2$ unit (wherein $Rf^2$ is as defined above), in which the hexafluoropropylene unit and the $CF_2=CF-ORf^2$ unit account for 5 to 30 mole percent in total.

The above II-1 to II-3 are the perfluoro type copolymers and are most excellent in heat resistance, chemical resistance, water repellency, non-stick, electric insulating and other properties, among fluorine-containing polymers.

As the above-mentioned copolymers (III), there may be mentioned, for example, carbonyl group-containing copolymers having a polymer chain comprising 15 to 99 mole percent of the vinylidene fluoride unit, 0 to 80 mole percent of the tetrafluoroethylene unit and 0 to 30 mole percent of the unit derived from at least one of hexafluoropropylene and chlorotrifluoroethylene, relative to the whole monomer except for the carbonyl group-containing monomer, when the polymer has a carbonyl group(s) on its side chain(s).

More specifically, there may be mentioned, for example:

(III-1) carbonyl group-containing copolymers having a polymer chain comprising 30 to 99 mole percent of the vinylidene fluoride unit and 1 to 70 mole percent of the tetrafluoroethylene unit;

(III-2) carbonyl group-containing copolymers having a polymer chain comprising 60 to 90 mole percent of the vinylidene fluoride unit, 0 to 30 mole percent of the tetrafluoroethylene unit and 1 to 20 mole percent of the chlorotrifluoroethylene unit;

(III-3) carbonyl group-containing copolymers having a polymer chain comprising 60 to 99 mole percent of the vinylidene fluoride unit, 0 to 30 mole percent of the tetrafluoroethylene unit and 5 to 30 mole percent of the hexafluoropropylene unit; and (III-4) carbonyl group-containing copolymers having a polymer chain comprising 15 to 60 mole percent of the vinylidene fluoride unit, 35 to 80 mole percent of the tetrafluoroethylene unit and 5 to 30 mole percent of the hexafluoropropylene unit.

The production method of the fluorine-containing ethylenic polymer according to the invention is not particularly restricted but may comprise copolymerizing an ethylenic monomer having a carbonyl group(s) or a carbonyl group-containing bonding(s) with fluorine-containing ethylenic monomer species selected and used in an appropriate mixing ratio according to the desired fluorine-containing polymer. As appropriate examples of the carbonyl group-containing ethylenic monomer, there may be mentioned fluorine-containing monomers such as perfluoroacryloyl fluoride, 1-fluoroacryloyl fluoride, acryloyl fluoride, 1-trifluoromethacryloyl fluoride and perfluorobutenoic acid and fluorine-free monomers such as acrylic acid, methacrylic acid, acryloyl chloride and vinylene carbonate. On the other hand, while various methods can be employed for producing fluorine-containing ethylenic polymers having a carbonyl group or groups at a polymer molecule terminus or termini, the method comprising using a peroxide, in particular a peroxy carbonate or a peroxy ester, as a polymerization initiator can preferably be employed among others from the economical viewpoint and the quality viewpoint, for example heat resistance and chemical resistance. By this method, it is possible to introduce, into a polymer chain terminus or termini, carbonyl groups derived from a peroxide, for example carbonate groups derived from a peroxy carbonate, ester groups derived from a peroxy ester, or carbonyl halide groups, carboxyl groups or acid anhydride groups derived therefrom by functional group conversion. Among such polymerization initiators, peroxy carbonates can lower the polymerization temperature and do not involve side reactions in the initiation reaction, hence are preferably used.

Preferably used as the above peroxy carbonates are compounds represented by the following formulas (1) to (4):

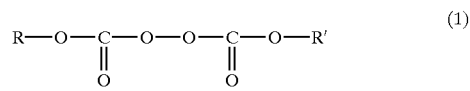

(1)

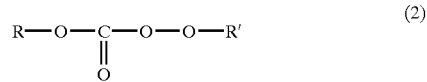

(2)

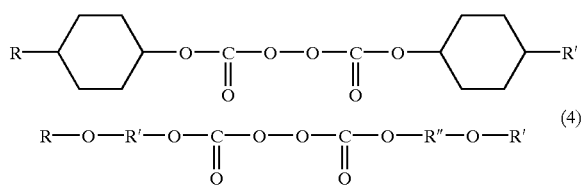

(3)

(4)

In the above formulas, R and R' each represents a straight or branched, saturated univalent hydrocarbon group containing 1 to 15 carbon atoms or an alkoxy group-terminated, straight or branched, saturated univalent hydrocarbon group containing 1 to 15 carbon atoms and R" represents a straight or branched, saturated divalent hydrocarbon group containing 1 to 15 carbon atoms or an alkoxy group-terminated straight or branched, saturated divalent hydrocarbon group containing 1 to 15 carbon atoms.

Particularly preferred among others are diisopropyl peroxydicarbonate, di-n-propyl peroxydicarbonate, tert-butylperoxy isopropyl carbonate, bis(4-tert-butylcyclohexyl) peroxydicarbonate, di-2-ethylhexyl peroxydicarbonate and the like.

The amount of the initiator to be used, for example a peroxy carbonate or a peroxy ester, may vary depending on the desired polymer species (e.g. composition), molecular weight, polymerization conditions and the initiator species employed. Generally, however, it is preferably 0.05 to 20 parts by weight, in particular 0.1 to 10 parts by weight, relative to 100 parts by weight of the polymer obtainable by the polymerization.

As for the method of polymerization, the technique of suspension polymerization in an aqueous medium using a fluorine-containing solvent and, as polymerization initiator, a peroxy carbonate or the like is preferred from the industrial viewpoint. However, other polymerization methods, for example solution polymerization, emulsion polymerization and bulk polymerization, can also be employed. In suspension polymerization, a fluorine-containing solvent may be used in addition to water. Usable as the fluorine-containing solvent in suspension polymerization are hydrochlorofluoroalkanes (e.g. $CH_3CClF_2$, $CH_3CCl_2F$, $CF_3CF_2CCl_2H$, $CF_2ClCF_2CFHCl$), chlorofluoroalkanes (e.g. $CF_2ClCFClCF_2CF_3$, $CF_3CFClCFClCF_3$), and perfluoroalkanes (e.g. perfluorocyclobutane, $CF_3CF_2CF_2CF_3$, $CF_3CF_2CF_2CF_2CF_3$, $CF_3CF_2CF_2CF_2CF_2CF_3$). Among them, perfluoroalkanes are preferred. In view of the suspensibility and economy, the fluorine-containing solvent is preferably used in an amount of 10 to 100% by weight relative to water.

The polymerization temperature is not particularly restricted but may be 0 to 100° C. The polymerization pressure is to be selected according to the species, amount and vapor pressure of the solvent employed, the polymerization temperature and other polymerization conditions. Generally, it may be 0 to 9.8 MPaG.

For molecular weight adjustment, conventional chain transfer agents can be used, for example hydrocarbons such as isopentane, n-pentane, n-hexane and cyclohexane; alcohols such as methanol and ethanol; and halogenated hydrocarbons such as carbon tetrachloride, chloroform, methylene chloride and methyl chloride. The terminal carbonate or ester group content can be controlled by adjusting the polymerization conditions, hence can be controlled by selecting the amount of the peroxy carbonate or peroxy ester employed, the amount of the chain transfer agent employed, the polymerization temperature, etc.

Various methods can be employed for obtaining fluorine-containing ethylenic polymers having a carbonyl halide group or groups at a polymer molecule terminus or termini. For example, such polymers can be obtained by heating, for causing thermal decomposition (decarboxylation), the above-mentioned fluorine-containing ethylenic polymers having a carbonate group(s) or an ester group(s) at a terminus or termini. The heating temperature depends on the carbonate group or ester group species and the fluorine-containing ethylenic polymer species. Preferably, heating is made so that the temperature of the polymer itself may reach 270° C. or above, preferably 280° C. or above, particularly preferably 300° C. or above. The upper limit to the heating temperature is preferably not higher than the thermal decomposition temperature of other sites than the carbonate or ester group of the fluorine-containing ethylenic polymer and, more specifically, not higher than 400° C., more preferably not higher than 350° C.

The fluorine-containing ethylenic polymer according to the invention is preferably used alone so that the adhesiveness, heat resistance and chemical resistance, intrinsic in itself may not be impaired. According to the intended purpose and use, however, one or more of various fillers, such as inorganic powders, glass fiber, carbon fiber, metal oxides and carbon may be incorporated therein at levels which will not deteriorate the performance characteristics of the fluorine-containing ethylenic polymer. In addition to the fillers, one or more of pigments, ultraviolet absorbers and other optional additives may be formulated. It is also possible to incorporate, in addition to such additives, a resin, for example another fluororesin or a thermoplastic or thermosetting resin, a synthetic rubber or the like to thereby improve the mechanical properties and weathering resistance, provide decorativeness, prevent electrostatic charging, improve the moldability, and so on. In particular, incorporation of an electrically conductive material, such as carbon black or acetylene black, is of advantage in preventing electrostatic charge accumulation on such products as fuel piping tubes and hoses, hence is preferred.

The layer (B) comprising the fluorine-containing ethylenic polymer according to the invention comprises the above-described fluorine-containing ethylenic polymer and another or other components incorporated according to need and, where necessary, the above layer (B) comprising the fluorine-containing ethylenic polymer may be electrically conductive. The term "electrically conductive" as used herein means that while electrostatic charge may accumulate upon continuous soaking of an insulating material such as a resin with an inflammable fluid such as gasoline, whereby the possibility of inflammation arises, the layer has an electrical property such that this electrostatic charge accumulation will not occur. It is provided in SAE (The Engineering Society for Advancing Mobility Land Sea Air and Space) J2260, for instance, that the surface resistivity should be not higher than $10^6$ Ω/□. For making the above layer (B) electrically conductive, the above-described electrically conductive material is incorporated preferably at a level not more than 20% by weight, more preferably not more than 15% by weight, in the composition constituting the above layer (B). The lower limit is such a level that the surface resistivity described above can be provided.

The laminated resin molding of the present invention is formed by laminating at least the above layer (A) and layer (B) with each other in an adhered state. Applicable to this process are, for example, the production method comprising molding the constituent layers, including the above layer (A) and layer (B), by successive extrusion or coextrusion and the production method comprising contact bonding of the moldings by heating and pressing, whereby a good adhesion state is formed between or among the constituent layers including the above layers (A) and (B). For the above production, machines generally used for molding thermoplastic resins, for example injection molding machines, compression molding machines, blow molding machines, and extrusion molding machines, can be used and sheets, tubes and various other shapes and forms can be produced. In producing multilayer tubes, multilayer hoses, multilayer tanks and other multilayer molded articles, such molding methods as the multilayer coextrusion molding, multilayer blow molding, and multilayer injection molding methods can be applied. Extrusion molding, in particular multilayer coextrusion molding, is preferred in molding tubes, hoses, sheets and the like. In molding hollow articles, such articles as in cylindrical shape, blow molding can suitably be used. It is also possible to produce lined products by overlaying another substrate with the molded sheet.

The molding conditions vary according to the carbonyl group species and the fluorine-containing ethylenic polymer species. In the case of extrusion or blow molding, it is appropriate to conduct heating so that the cylinder temperature may arrive at 200° C. or above. The upper limit to the heating temperature is preferably the temperature at which such adverse effects as foaming due to thermal decomposition of the fluorine-containing ethylenic polymer itself can be suppressed; specifically, it should not be higher than 400° C., more preferably not higher than 350° C.

In cases where the molded articles are complicated in shape or where the molded articles are subjected to heating and bending after molding, it is also possible to mold the above laminated resin molding by melt extrusion to form a multilayer molding and treat the thus-formed multilayer molding at a temperature lower than the lowest melting point among the melting points of the resins constituting the above molding for 0.01 to 10 hours to give the desired molded article in order to remove the residual strain in the molded article. By employing this production method, it is possible to remove the residual strain, supposedly allow unreacted groups in the vicinity of the layer interface to react and thereby further increase the adhesion strength of the multilayer molded article synergistically. Preferably, the above heat treatment is carried out at 60° C. or above, more preferably at 80° C. or above.

In accordance with the present invention, the initial interlayer adhesion strength between the layer (A) comprising the polyamide-based resin composition and the layer (B) comprising the fluorine-containing ethylenic polymer having the carbonyl group can amount to not less than 20 N/cm.

When the above layer (A) and layer (B) are heated in the above manner, the functional groups occurring therein may partly be decomposed or react. The resin laminate comprising such a layer (A) formed by melt extrusion of a polyamide-based resin composition and a layer (B) formed by melt extrusion is also a resin laminate according to the invention. Therefore, the above layer (B), for instance, may be one formed by melt extrusion of a fluorine-containing ethylenic polymer having a carbonate group and/or a carbonyl halide group and, when the functional group decomposition in the step of molding and/or with time is taken into consideration, the layer (B) comprising the fluorine-containing ethylenic polymer having the carbonyl group is equivalent to one comprising a fluorine-containing ethylenic polymer having at least one group species selected from the group consisting of carbonate group, carbonyl halide group and carboxyl group.

In the practice of the invention, the layer (B) comprising the fluorine-containing ethylenic polymer having the carbonyl group may have a thickness less than 0.5 mm. When a layer better in liquid agent/fuel permeability resistance than the layer (B) is used as a layer (C) or layer (D), which is to be described later herein, the layer (B) may be thin. As for the range, the layer (B) may be less than 1.5 times the thickness of the layer (C) or, in case that the layer (D) laminated, less than 1.5 times the total thickness of the layer (C) and layer (D). In cases where the above layer (B) is to serve as an intermediate adhesive layer, it is therefore possible to reduce the thickness of the adhesive layer. This is economically advantageous.

In the practice of the present invention, the above layer (B) comprising the fluorine-containing ethylenic polymer having the carbonyl group may be further laminated to a layer (C) comprising a fluororesin. Where necessary, the above layer (C) comprising the fluororesin may contain the electrically conductive material for providing the laminate with electric conductivity. In this case, the level of addition of the electrically conductive material may be such that electric conductivity can be provided. Thus, the addition level may be as described above.

The above-described fluororesin is not particularly restricted but may be any melt-moldable fluororesin, including, for example, tetrafluoroethylene/fluoro(alkylvinyl ether) copolymers (PFA), tetrafluoroethylene/hexafluoropropylene copolymers (FEP), ethylene/tetrafluoroethylene copolymers (ETFE), polychlorotrifluoroethylene (PCTFE), ethylene/chlorotrifluoroethylene copolymers (ECTFE), polyvinyl fluoride (PVF) and polyvinylidene fluoride (PVDF). It may be the above-described fluorine-containing ethylenic polymer.

Among them, those having a melt flow rate of 0.5 to 100 g/10 minutes at an arbitrarily selected temperature between 230° C. and 350° C. are suited for use in producing fuel piping tubes and hoses, which show a low level of liquid agent/fuel permeability and excellent in flexibility, cold temperature impact resistance, heat resistance and so forth, by simultaneous multilayer extrusion with the polyamide-based resin composition.

The fluororesin in the above layer (B) and that in the above layer (C) may be the same or different. From the adhesiveness viewpoint, they are preferably of the same species.

In the practice of the invention, the above layer (B) may be further laminated to a layer (A') comprising a polyamide-based resin composition in lieu of the layer (C) comprising the fluororesin. Where necessary, the layer (A') comprising the polyamide-based resin composition may contain an electrically conductive material for providing electric conductivity. In this case, the polyamide-based resin composition may be the same as or different from the polyamide-based resin composition of the above layer (A).

In the practice of the invention, a layer (C) comprising a fluororesin and not containing an electrically conductive material and further a layer (D) comprising th fluororesin and containing an electrically conductive material may be laminated. In this case, the level of addition of the electrically conductive material may be such that electric conductivity can be provided. Thus, the addition level may be as described above. Any of the fluororesins described above may be used as the fluororesin constituting the above layer (D), and the fluororesin may be the same as or different from the resin of the above layer (C).

The laminated resin molding according to the invention is typically a laminated resin molding for use of a liquid agent, in particular a laminated resin molding for use in transporting, storing and like of a liquid agent, which comprises a layer (A) formed by melt extrusion of a polyamide resin composition and a layer (B) formed by melt extrusion of a fluorine-containing ethylenic polymer having a carbonyl group and laminated to the above layer (A), in which the above layer (A) is formed by melt extrusion of the polyamide-based resin composition having a functional group(s), in addition to an amide group, selected from the group consisting of hydroxyl group, carboxyl group, ester group and sulfonamide group in a total amount of 1 to 50 equivalent percent relative to the amide group and in which the above layer (B) is one formed by melt extrusion of the fluorine-containing ethylenic polymer having the carbonyl group, said fluorine-containing ethylenic polymer having the carbonyl group being the one having a carbonate group and/or a carbonyl halide group in a total amount of 3 to 1,000 groups per $1 \times 10^6$ main chain carbon atoms and having a melting point of 160 to 270° C.

In the practice of the invention, the liquid agent, namely such a liquid agent capable of deteriorating polyamide-based resins as a solvent or fuel, is not particularly restricted but includes, for example, organic acids such as acetic acid, formic acid, cresol and phenol; inorganic acids such as hydrochloric acid, nitric acid and sulfuric acid; alkaline solutions such as sodium hydroxide and potassium hydroxide; alcohols such as methanol and ethanol; amines such as ethylenediamine, diethylenetriamine and ethanolamines; amides such as dimethylacetamide; esters such as ethyl acetate and butyl acetate; fuels such as gasoline, light oil and heavy oil, pseudofuels such as Fuel C; and mixed fuels composed of these and a peroxide, methanol, ethanol or the like; and other organic and inorganic liquids.

The multilayer molded article according to the invention comprises the above-described laminated resin molding of the invention. The multilayer molded article includes, for example:

tubes and hoses: automotive fuel piping tubes or hoses, automotive radiator hoses, brake hoses, air conditioner hoses, and the like;

films and sheets: diaphragm pump diaphragms, various packing members and like sliding members required to have high chemical resistance, and the like;

tanks: automotive radiator tanks, liquid agent bottles, liquid agent tanks, bags, containers for chemicals, gasoline tanks, and the like;

others: carburetor flange gaskets, fuel pump 0 rings, like various automotive seals, seals in the chemical industry such as seals in chemical pumps and flow meters, seals in the machinery industry such as hydraulic instrument seals and the like.

Among them, preferred embodiments are, for example, as follows:

(i) tubes or hoses or tanks; automotive fuel piping tubes or hoses or tanks, or tubes or hoses or tanks for use of a liquid agent, in particular; each having an at least two-layer structure comprising, as an outer layer, the layer (A) comprising the polyamide-based resin composition and, as an inner layer, the layer (B) comprising the fluorine-containing ethylenic polymer having the carbonyl group, which may contain electrically conductive material;

(ii) tubes or hoses or tanks; automotive fuel piping tubes or hoses or tanks, or tubes or hoses or tanks for use of a liquid agent, in particular; each having an at least three-layer structure comprising, as an outer layer, the layer (A) comprising the polyamide-based resin composition; as an intermediate layer, the layer (B) comprising the fluorine-containing ethylenic polymer having the carbonyl group; and, as an inner layer, the layer (C) comprising the fluororesin, which may contain the electrically conductive material;

(iii) tubes or hoses or tanks, in particular automotive fuel piping tubes or hoses or tanks, each having an at least three-layer structure comprising, as an outer layer, the layer (A) comprising the polyamide-based resin composition; as an intermediate layer, the layer (B) comprising the fluorine-containing ethylenic polymer having the carbonyl group; and, as an inner layer, the layer (A') comprising the polyamide-based resin composition, which may contain an electrically conductive material as necessary; and (iv) tubes or hoses or tanks; automotive fuel piping tubes or hoses or tanks, or tubes or hoses or tanks for use of a liquid agent, in particular; each having an at least four-layer structure comprising, as an outer layer, the layer (A) comprising the polyamide-based resin composition; as an intermediate layer, the layer (B) comprising the fluorine-containing ethylenic polymer having the carbonyl group; as an inner layer, the layer (C) comprising the fluororesin and not containing the electrically conductive material; and, as the innermost layer, the layer (D) comprising the fluororesin, which contains the electrically conductive material.

In the case of tubes or hoses for automotive fuel piping or for use of liquid agents, the burst pressure as found in a burst test carried out after the falling ball test carried out at −40° C. for automotive fuel tubes as indicated in SAE J 2260 is preferably above 75% of the burst pressure before the falling ball test.

In the above embodiments (i), (ii) and (iv), it is preferred, from the fuel resistance viewpoint, that the layer being soaked with a fuel, in particular when it contains an electrically conductive material, have a low MFR. Thus, for example, it may be not higher than 100 g/10 minutes, preferably not higher than 40 g/10 minutes, as measured at 297° C. and, when measured at 265° C., it may be not higher than 50 g/10 minutes, preferably not higher than 20 g/10 minutes.

In the above embodiments (i) to (iv), the layer (A) comprising the polyamide-based resin composition alone or all the layers may be made in the corrugated form or in the convoluted form, for instance, for the purpose of attachability or shock absorption, etc. Furthermore, the tubes or hoses may be supplemented with a necessary part or parts, for example a connector, or may be subjected to bending to give an L- or U-shaped form.

Meanwhile, it has been observed by the present inventors that the laminated resin molding according to the invention which contains 5 to 30% by weight, for instance, of a plasticizer having at least one functional group selected from the group consisting of hydroxyl group, carboxyl group, ester group and sulfonamide group in the polyamide-based resin composition has a quite unexpected effect on the liquid agent permeability. It is generally known that the liquid agent permeability of a laminate can be calculated in terms of predicted value Pm according to the following equation:

$$1/Pm = \Sigma(\Phi i/Pi)$$

in the formula, $\Phi i$ is the volume fraction of the $i^{th}$ layer of the laminated resin molding and $Pi$ is the permeation rate of the resin layer constituting the $i^{th}$ layer of the laminated resin molding, when tested as a single-layer, against the liquid agent. Generally, $Pi$ shows a degree of permeability against the liquid agent under predetermined conditions and, therefore, it can be said that a layer having a high Pi value is less contributive to the laminate from the viewpoint of reduction in the liquid agent permeability. In the case of single-layer nylon tubes, the permeation rate generally increases with the increase in plasticizer content in the nylon and, thus, the presence of a plasticizer in single-layer nylon tubes exerts an unfavorable influence in reducing the liquid agent permeability. The permeation rate of single-layer nylon tubes with a plasticizer content of 12% by weight as observable against the pseudofuel Fuel CM15 (toluene/isooctane/methanol=17/17/6, in a volume ratio) is about 645 g/day/m$^2$ (60° C.) while, in the case of plasticizer-free single-layer nylon tubes, a value of about 497 g/day/m$^2$ (60° C.) is observable. On the contrary, it is known that the value for a fluorine-containing ethylenic polymer is generally about one tenth to one hundredth of the above-mentioned value for nylon. Therefore, according to the above equation for calculating the permeation rate of a laminate, it is anticipated that the contribution of the nylon layer to the liquid agent permeability of the laminate will be very small as compared with the fluorine-containing ethylenic polymer and that the incorporation of the plasticizer in the nylon layer will have a very slight influence.

Contrary to this anticipation, however, regarding a laminate comprising a plasticizer-containing nylon layer and a fluorine-containing ethylenic polymer layer, it has been found that when the fluorine-containing ethylenic polymer layer side is soaked with a liquid agent, the permeation rate of the laminate decreases significantly with the increase in the plasticizer content in the nylon layer until a permeation rate lower than the value calculated according to the above equation can be attained. The reason why such unexpected results are produced is not yet clear. Presumably, however, it is important that the laminate has an at least two-layer structure comprising a resin layer containing a compound, for example a plasticizer, having high affinity for a component contained in the liquid agent and a resin layer capable of preventing that compound from migrating to the liquid agent.

Thus, the present invention is also directed to a laminated resin molding which comprises a layer (I) comprising a polyamide-based resin composition and a layer (II) laminated to said layer (I), said polyamide-based resin composition containing a plasticizer having at least one functional group species selected from the group consisting of hydroxyl group, carboxyl group, ester group and sulfonamide group, said layer (II) comprising a fluorine-containing ethylenic polymer having a carbonyl group, and a permeation rate of the molding against a liquid agent, in case that the liquid agent is soaked with the layer (II) side, being lower than the calculated permeation rate Pm defined by the following equation:

$$1/Pm = \Sigma(\Phi i/Pi)$$

in the formula, $\Phi i$ is a volume fraction of the $i^{th}$ layer of the laminated resin molding and Pi is the permeation rate of the resin layer constituting the $i^{th}$ layer of the laminated resin molding, when tested as a single-layer, against the liquid agent.

In accordance with the method of the present invention, it is possible to reduce, in an easy and simple manner, the permeability, against a liquid agent, of a laminated resin molding which comprises a layer (I) and a layer (II) laminated to the above layer (I), which comprises incorporating, in the above layer (I), a compound having high affinity for the above liquid agent and capable of being prevented, by the above layer (II), from migrating to the above liquid agent, said layer (I) comprising a polyamide-based resin composition, and said layer (II) comprising a fluorine-containing ethylenic polymer.

According to the production method of the invention, it is possible to produce, expediently and dependably, a laminated resin molding having low liquid agent permeability and comprising a layer (I) comprising a polyamide-based resin composition and a layer (II) comprising a fluorine-containing ethylenic polymer laminated to the above layer (I) by employing a production method comprising incorporating, in the polyamide-based resin composition constituting the above layer (I), a compound having high affinity for the above liquid agent and capable of being prevented, by the above layer (II), from migrating to the above liquid agent and subjecting the resulting composition to lamination.

The compound having high affinity for a liquid agent and capable of being prevented from migrating to the above liquid agent by the layer (II) is not particularly restricted but, when the liquid agent is an alcohol-containing one, a plasticizer having a functional group(s) selected from the group consisting of hydroxyl group, carboxyl group, ester group and sulfonamide group is preferred.

The above-mentioned plasticizer is not particularly restricted but may be any of the plasticizers having a functional group(s) selected from the group consisting of hydroxyl group, carboxyl group, ester group and sulfonamide group. Those plasticizers already disclosed herein can appropriately be used, and those having a sulfonamide group(s) are preferred among others and, further, those having a sulfonamide group(s) directly bound to an aromatic ring are preferred.

The addition level of the plasticizer described above is preferably 5 to 30% by weight, more preferably 8 to 25% by weight, relative to the polyamide-based resin composition. When it is less than 5% by weight, the permeation rate to the liquid agent may not be lower than the calculated permeation rate Pm as calculated according to the above-given equation in some instances. When it exceeds 40% by weight, the possibility of bleeding out may arise.

The above laminated resin molding having low liquid agent permeability can be used for various polar solvents, preferably with alcohol-containing liquid agents, in particular lower alcohol-containing liquid agents.

In the layer (I) comprising the polyamide-based resin composition, the polyamide-based resin composition is not particularly restricted but those polyamide-based resin compositions already disclosed herein referring to the layer (A) comprising the polyamide-based resin composition can appropriately be used. Among them, nylon 11, nylon 12, nylon 610, nylon 612, nylon 6/polyether copolymers, and nylon 12/polyether copolymers are preferred as the polyamide-based resin.

The layer (II) comprising the fluorine-containing ethylenic polymer is not particularly restricted but may be any layer that can substantially prevent the plasticizer from being extracted with liquid agents. It can appropriately be selected according to the plasticizer to be used. For example, those fluororesin compositions already disclosed herein referring to the layer (B) comprising the fluorine-containing ethylenic polymer having the carbonyl group can preferably be used. The above layer (II) may have electric conductivity. A resin layer having affinity with the layer (II) may also be provided on an inner side of the layer (II). Of course, this layer may have electric conductivity.

The multilayer molded article according to the invention may have a jacket layer as the outermost layer thereof for the purpose of protection, antifouling, insulation and/or shock absorbance, for instance. The above jacket layer is formed, for example, by coextrusion with the laminated resin molding or by covering in a separate step, using a resin, a natural or synthetic rubber, or the like. It is also possible to reinforce the laminated resin molding with a metal or the like.

BEST MODES FOR CARRYING OUT THE INVENTION

The following Synthesis Examples and Examples illustrate the present invention in further detail. These Examples are, however, by no means limitative of the scope of the present invention. In the following Examples, various parameter measurements were carried out in the following manner.

(1) Amine Value Determination

One gram of each polyamide-based resin was dissolved in 50 ml of m-cresol with heating. The solution was titrated with a 1/10 N aqueous solution of p-toluenesulfonic acid using thymol blue as an indicator, and the amount of amino groups occurring in $10^6$ g of the polyamide-based resin was calculated.

(2) Acid Value Determination

One gram of each polyamide-based resin was dissolved in 50 ml of benzyl alcohol with heating. The solution was titrated with a 1/30 N sodium hydroxide solution in benzyl alcohol using phenolphthalein as an indicator, and the amount of carboxyl groups occurring in $10^6$ g of the polyamide-based resin was calculated.

(3) Relative Viscosity Measurement

According to JIS K 6810, 1 g of each polyamide-based resin was dissolved in 100 ml of 98% sulfuric acid and the viscosity of the solution was measured at 25° C. using an Ubbelohde viscometer.

(4) Determination of the Number of Carbonate Groups

The white powder of each fluorine-containing ethylenic polymer obtained or pieces cut from the melt-extruded pellets prepared therefrom were subjected to compression molding at room temperature to give a uniform film having a thickness of 0.05 to 0.2 mm. This film was subjected to infrared spectrophotometry, and the absorbance of the carbonate (—OC(=O)O—) carbonyl-due peak ($v_{C=O}$) appearing at the absorption wavelength corresponding to 1809 $cm^{-1}$ was measured. The number (N) of carbonate groups per $10^6$ main chain carbon atoms was calculated according to the formula (1) given below:

$$N=500\ AW/\epsilon df \quad (1)$$

A: absorbance of the carbonate (—OC(=O)O—) group-due $v_{C=O}$ peak;

$\epsilon$: molar extinction coefficient of the carbonate (—OC(=O)O—) group-due $v_{C=O}$ peak [$1 \cdot cm^{-1} \cdot mol^{-1}$]. $\epsilon$=170 was employed on a model compound basis;

W: average molecular weight of monomer units as calculated on the monomer composition basis;

d: film density [$g/cm^3$];

f: film thickness [mm].

Infrared spectrometric analysis was carried out using a Perkin-Elmer FTIR spectrometer 1760x(product of Perkin-Elmer) by performing scanning 40 times. The baseline of the IR spectrum obtained was automatically read using a Perkin-Elmer Spectrum for Windows Ver. 1.4C, and the absorbance of the peak at 1809 $cm^{-1}$ was measured. The film thickness was measured using a micrometer.

(5) Determination of the Number of Carbonyl Fluoride Groups

A film obtained in the same manner as described above under (4) was subjected to infrared absorption spectrophotometry, and the absorbance of the carbonyl fluoride (—C(=O)F) carbonyl-due peak ($v_{C=O}$) appearing at the wavelength corresponding to 1880 $cm^{-1}$ was determined. Then, the number of carbonyl fluoride groups was calculated by means of the same formula (1) as used above under (4) except that $\epsilon$=600 was employed as the molar extinction coefficient [$1 \cdot cm^{-1} \cdot mol^{-1}$] of the carbonyl fluoride carbonyl-due $v_{C=O}$ peak on a model compound basis.

(6) Determination of the Number of Other Carbonyl Groups

A film prepared in the same manner as mentioned above under (4) was subjected to infrared absorption spectrophotometry, and the absorbance of the $v_{C=O}$ peak ascribable to other carbonyl groups, such as the carboxyl group, was measured. The number of other carbonyl groups was determined using the above formula (1) in the same manner as mentioned above under (4) except that $\epsilon$=530 was employed as the molar extinction coefficient [$1 \cdot cm^{-1} \cdot mol^{-1}$] of the $v_{C=O}$ peak.

(7) Determination of the Composition of the Fluorine-Containing Ethylenic Polymer The determination was carried out by $^{19}$F-NMR analysis.

(8) Melting Point (Tm) Determination

Using a Seiko DSC apparatus (product of Seiko Denshi), the temperature was raised at a rate of 10° C./min and the melting peaks were recorded. The temperature corresponding to the maximum value was reported as the melting point (Tm).

(9) MFR (Melt Flow Rate) Determination

Using a melt indexer (product of Toyo Seiki Seisakusho K.K.), the weights (g) of the polymer flowing out through a nozzle with a diameter of 2 mm and a length of 8 mm within a unit time (10 minutes) were measured under a load of 5 kg at different temperatures.

(10) Appearance of the Multilayer Tube Inside and Outside Surfaces

Each tube obtained was cut to give two semicircular sections and the outer and inner surfaces were evaluated by visual observation or under a stereoscopic microscope at a magnification up to 50 times, for surface roughness, foaming and other defects according to the following criteria:

○: no defects are observed;

Δ: some or other defects are observed on less than 2% of the whole surface;

X: some or other defects are observed on 2% or more of the whole surface.

(11) Multilayer Tube Adhesion Strength Determination

Test specimens with a width of 1 cm were cut from each tube and subjected to 180° peel testing at a rate of 25 mm/min on a Tensilon universal tester. The mean of five maximum values found on an elongation-tensile strength graph was reported as the interlayer adhesion strength.

(12) Surface Resistivity Measurement

The method described in SAE J 2260 was followed.

(13) Determination of the Adhesion Strength Retention after Soaking with a Liquid Agent The multilayer tube to be tested was filled with a pseudofuel (Fuel CM15, toluene/isooctane/methanol=17/17/6, in a volume ratio), both the ends were hermetically stoppered, and the whole was maintained in an oven at 60° C. for 168 hours. Then, after complete removal of the liquid contents inside, the tube was thoroughly air-dried and subjected to adhesion strength determination by the method mentioned above under (11). The adhesion strength retention after soaking with the liquid agent was calculated as follows:

Adhesion strength retention after soaking with liquid agent (%)= [adhesion strength after air drying]/[adhesion strength before filling pseudofuel in the tube]×100

(14) Tube Cold Temperature Impact Resistance Determination

The method used was as described in SAE J 2260. The result was expressed in terms of the number of tube specimens, out of 10, showing, in the burst test after the falling ball test, a burst pressure of not more than 75% of that before the falling ball test. Thus, for example, the result "0/10" indicates that all the tubes tested after the falling ball test showed a burst pressure exceeding 75% of that before the falling ball test.

(15) Tube Liquid Agent Permeation Rate Determination

A 40-cm-long tube was hermetically stoppered at one end, the liquid agent was filled in the tube, and the tube was fitted with a 100-mL reservoir tank. This tube was maintained in a constant-temperature oven for the prescribed period of time and, then, the liquid agent permeation rate was calculated according to the formula (II) given below based on the change in tube weight. According to SAE 1737, a fresh portion of the liquid agent was exchanged for the liquid agent when the loss of the liquid amounted to 1% or more on the whole liquid weight basis. The test period and the judgment as to attainment of a steady state of permeation were as described in SAE 1737.

$p = W/\pi dL$ (II)

W: change in weight (g/day)
d: tube inside diameter (m)
L: tube length (m)
p: permeation rate

SYNTHESIS EXAMPLE 1

Synthesis of Polyamide Resin PA-A (Nylon 12)

An autoclave was charged with 20 kg of ω-laurolactam and 1 kg of distilled water and, after nitrogen purging, the temperature was raised. After arriving at 280° C., the system inside was maintained at this temperature and a pressure of 3.2 MPa for 5 hours and, thereafter, gradually depressurized. During this period, after dissolution in water and melting of ω-laurolactam, the charge was stirred. After restoration of ordinary pressure in the system, 100 g of stearic acid was added and then stirring was further continued at 260° C. for 5 hours in a nitrogen atmosphere, followed by discharging and cooling with water. Treatment on a pelletizer gave white pellets (polyamide resin PA-A). Analyses revealed that these pellets had a melting point of 178° C., an acid value of 28 equivalents/$10^6$ g, an amine value of 6.8 equivalents/$10^6$ g and a relative viscosity of 3.0.

SYNTHESIS EXAMPLE 2

Synthesis of Polyamide Resin PA-B (Nylon 11)

An autoclave was charged with 20 kg of 11-aminoundecanoic acid powder, 5 kg of distilled water and 100 g of a 30% aqueous solution of phosphoric acid and, after nitrogen purging, the temperature was raised in a tightly closed state. The system was maintained at 120° C. for 2 hours and the temperature was then further raised and the system was maintained at 220° C. and 0.4 MPa for 2 hours and, thereafter, gradually depressurized. During this period, after dissolution in water and melting of 11-aminoundecanoic acid, the charge was stirred. After restoration of ordinary pressure in the system, 110 g of stearic acid was added and then stirring was further continued at 265° C. for 4 hours in a nitrogen atmosphere, followed by discharging and cooling with water. Treatment on a pelletizer gave white pellets (polyamide resin PA-B). As a result of analysis, these pellets were found to have a melting point of 186° C., an acid value of 33 equivalents/$10^6$ g, an amine value of 8.4 equivalents/$10^6$ g and a relative viscosity of 2.9.

SYNTHESIS EXAMPLE 3

Synthesis of Polyamide-Based Resin Composition PA-C

The polyamide resin PA-A and N-ethyltoluenesulfonamide were dry blended in a weight ratio of 95/5 (sulfonamide group content being 5.2 equivalent percent relative to the amide groups), and the blend was extruded at 260° C. and at a discharge amount of 350 g/minute using a twin-screw extruder (product of Ikegai Tekkosho, PCM-45). After cooling with water, treatment on a pelletizer gave white pellets (polyamide-based resin composition PA-C). The functional group content (%) relative to the amide groups is shown in Table 1.

SYNTHESIS EXAMPLES 4 TO 10

Synthesis of Polyamide-Based Resin Compositions PA-D to PA-J

Polyamide-based resin compositions PA-D to PA-J were produced in the same manner as in Synthesis Example 3 except that the compositions were as specified in Table 1. The respective functional group contents (%) based on the amide groups are shown in Table 1.

TABLE 1

| | Polyamide-based resin composition | Resin composition (wt %) | | Functional group content relative to amide groups (eq %) |
|---|---|---|---|---|
| | | Polyamide resin | Additive | |
| Synthesis example 3 | PA-C | PA-A (95) | N-Ethyltoluenesulfonamide (5) | 5.2 |
| Synthesis example 4 | PA-D | PA-A (99) | 2-Ethylhexyl p-hydroxybenzoate (1) | 1.6 |
| Synthesis example 5 | PA-E | PA-A (90) | Modified olefinic resin[(*)] (10) | 6.5 |
| Synthesis example 6 | PA-F | PA-A (94) | Bisphenol A (5) Colorant (carbon black) (1) | 9.2 |
| Synthesis example 7 | PA-G | PA-A (85) | N-butylbenzenesulfonamide (15) | 17 |

TABLE 1-continued

| | Polyamide-based resin composition | Resin composition (wt %) | | Functional group content relative to amide groups (eq %) |
|---|---|---|---|---|
| | | Polyamide resin | Additive | |
| Synthesis example 8 | PA-H | PA-A (99.5) | Polytetramethylene glycol with number average molecular weight of 6000 (0.5) | 0.033 |
| Synthesis example 9 | PA-I | PA-B (70) | N-butylbenzenesulfonamide (30) | 39 |
| Synthesis example 10 | PA-J | PA-B (50) | Modified olefinic resin(*) (10) N-butylbenzenesulfonamide (40) | 84 |

(*)Ethylene/methyl acrylate = 90/10 (wt %) copolymer

SYNTHESIS EXAMPLES 11 TO 13

Synthesis of Polyamide-Based Resin Compositions PA-K to PA-M

Polyamide-based resin compositions PA-K to PA-M were produced in the same manner as in Synthesis Example 3 except that the compositions were as specified in Table 2.

TABLE 2

| | Polyamide-based resin composition | Resin composition (wt %) | |
|---|---|---|---|
| | | Polyamide resin | Additive |
| Synthesis example 11 | PA-K | PA-A (95) | N-butylbenzenesulfonamide (5) |
| Synthesis example 12 | PA-L | PA-A (88) | N-butylbenzenesulfonamide (12) |
| Synthesis example 13 | PA-M | PA-A (80) | N-butylbenzenesulfonamide (20) |

SYNTHESIS EXAMPLE 14

Synthesis of Fluorine-Containing Ethylenic Polymer F-A

An autoclave was charged with 380 L of distilled water and, after thorough nitrogen purging, charged with 75 kg of 1-fluoro-1,1-dichloroethane, 155 kg of hexafluoropropylene and 0.5 kg of perfluoro(1,1,5-trihydro-1-pentene), and the system inside was maintained at 35° C. and at a stirring rate of 200 rpm. Thereafter, tetrafluoroethylene was charged under pressure to 0.7 MPa, followed by charging of ethylene under pressure to 1.0 MPa. Then, 2.4 kg of di-n-propyl peroxydicarbonate was charged to initiate the polymerization. As the polymerization progressed, the system inside pressure decreased, so that a mixed gas composed of tetrafluoroethylene/ethylene/hexafluoropropylene 40.5/44.5/15.0 mole percent was continuously fed to maintain the system inside pressure at 1.0 MPa. As for perfluoro(1,1,5-trihydro-1-pentene), a total of 1.5 kg was charged continuously. Stirring was continued for 20 hours. Then, after depressurization to atmospheric pressure, the reaction product was washed with water and dried to give 200 kg of a powder (fluorine-containing ethylenic polymer F-A). The results of analyses of this product are shown in Table 3.

SYNTHESIS EXAMPLES 15 AND 16

Synthesis of Fluorine-Containing Ethylenic Polymers F-B and F-C

Fluorine-containing ethylenic polymers F-B and F-C were produced in the same manner as in Synthesis Example 14 according to the compositions specified in Table 3. The results of analysis of these are shown in Table 3.

SYNTHESIS EXAMPLE 17

Synthesis of Fluorine-Containing Ethylenic Polymer F-D

An autoclave was charged with 400 L of distilled water and, after thorough nitrogen purging, charged with 320 kg of perfluorocyclobutane, 80 kg of hexafluoropropylene, 19 kg of tetrafluoroethylene and 6 kg of vinylidene fluoride, and the system inside was maintained at 35° C. and at a stirring rate of 180 rpm. Thereafter, 5 kg of di-n-propyl peroxydicarbonate was charged to initiate the polymerization. As the polymerization progressed, the system inside pressure decreased, so that a mixed gas composed of tetrafluoroethylene/vinylidene fluoride/hexafluoropropylene=50/40/10 mole percent was continuously fed to maintain the system inside pressure at a constant level. Stirring was continued for 30 hours. Then, after depressurization to atmospheric pressure, the reaction product was washed with water and dried to give 200 kg of a powder (fluorine-containing ethylenic polymer F-D). The results of analyses of this product are shown in Table 3.

SYNTHESIS EXAMPLE 18

Synthesis of Fluorine-Containing Ethylenic Polymer F-E

An autoclave was charged with 400 L of distilled water and, after thorough nitrogen purging, charged with 75 kg of 1-fluoro-1,1-dichloroethane, 190 kg of hexafluoropropylene and 1.5 kg of perfluoro(1,1,5-trihydro-1-pentene), and the system inside was maintained at 35° C. and at a stirring rate of 200 rpm. Thereafter, tetrafluoroethylene was charged under pressure to 0.7 MPa, followed by charging of ethylene under pressure to 1.0 MPa. Then, 2.6 kg of di-n-propyl peroxydicarbonate was charged to initiate the polymerization. As the polymerization progressed, the system inside pressure decreased, so that a mixed gas composed of tetrafluoroethylene/ethylene/hexafluoropropylene=40.5/42.5/17.0 mole percent was continuously fed to maintain the system inside pressure at 1.0 MPa. Stirring was continued for 30 hours. Then, after depressurization to atmospheric pressure, the reaction product was washed with water and dried to give 172 kg of powder. The powder obtained was then extruded at a cylinder temperature of 320° C. using a single screw extruder (product of Tanabe Practice Kikai, VS 50-24) to give pellets (fluorine-containing ethylenic polymer F-E). The results of analyses of this product are shown in Table 3.

SYNTHESIS EXAMPLE 19

Synthesis of Fluorine-Containing Ethylenic Polymer F-F

The powder of fluorine-containing ethylenic polymer F-C as obtained in Synthesis Example 16 was dry-blended with an electrically conductive material (acetylene black) in a mixing ratio of 90/10 by weight, and the mixture was melted and kneaded at a cylinder temperature of 250° C. using a twin-screw extruder (product of Ikegai Tekkosho, PCM-45). The results of analyses of the thus-obtained pellets (fluorine-containing ethylenic polymer F-F) are shown in Table 3.

SYNTHESIS EXAMPLE 20

Synthesis of Fluorine-Containing Ethylenic Polymer F-G

The fluorine-containing ethylenic polymer F-B obtained in Synthesis Example 15 was dry-blended with an electrically conductive material (acetylene black) in a mixing ratio of 85/15 by weight, and the mixture was melted and kneaded in the same manner as in Synthesis Example 16 except that the cylinder temperature was 245° C. The results of analyses of the thus-obtained pellets (fluorine-containing ethylenic polymer F-G) are shown in Table 3.

SYNTHESIS EXAMPLE 21

Synthesis of Fluorine-Containing Ethylenic Polymer F-H

An autoclave was charged with 9.5 kg of the powder of fluorine-containing ethylenic polymer F-B as obtained in Synthesis Example 15, 700 g of 28% ammonia water and 10 L of distilled water, the system was heated with stirring, and stirring was continued for 7 hours while maintaining the temperature at 80° C. The contents were washed with water and subjected to drying treatment to give 9.2 kg of a powder. By such treatment, the active functional groups (carbonate groups and carbonyl fluoride groups) contained in the above resin were converted to amide groups, which are chemically and thermally stable. The quantitative progress of such conversion was confirmed by infrared spectrophotometry. The results of analyses of the resin after treatment are shown in Table 3. In Table 3, TFE stands for tetrafluoroethylene, Et for ethylene, HFP for hexafluoropropylene, VdF for vinylidene fluoride, and HF-Pe for perfluoro(1,1,5-trihydro-1-pentene). The carbonyl group species whose occurrence in the fluorine-containing ethylenic polymers (F-A to F-G) obtained in Synthesis Examples 14 to 20 had been established were carbonate groups and carbonyl fluoride group alone.

SYNTHESIS EXAMPLE 22

Synthesis of Fluorine-Containing Ethylenic Polymer F-L

Fluorine-containing ethylenic polymer F-L was produced in the same manner as in Synthesis Example 14 according to the composition specified in Table 3. The results of analysis of this product are shown in Table 3.

TABLE 3

| | Fluorine-containing ethylenic polymer | Monomer composition (mole %) | | | | | Number of groups occurring per $10^6$ main chain carbon atoms | | Melting point (° C.) | MFR (g/10 min) (measurement temp.) (° C.) |
|---|---|---|---|---|---|---|---|---|---|---|
| | | TFE | Et | HFP | VdF | HF-Pe | Carbonate groups | Carbonyl fluoride groups | | |
| Synthesis example 14 | F-A | 40.8 | 44.8 | 13.9 | — | 0.5 | 300 | 3 | 162.5 | 2.6 (230) |
| Synthesis example 15 | F-B | 46.2 | 43.8 | 9.5 | — | 0.5 | 255 | 5 | 194.3 | 8.9 (230) |
| Synthesis example 16 | F-C | 47.1 | 44.1 | 8.3 | — | 0.5 | 189 | 7 | 207.4 | 8.3 (230) |
| Synthesis example 17 | F-D | 51.3 | — | 9.8 | 38.9 | — | 311 | 3 | 169.2 | 13.8 (230) |
| Synthesis example 18 | F-E | 40.5 | 45.0 | 14.0 | — | 0.5 | 67 | 67 | 170.2 | 11.3 (230) |
| Synthesis example 19 | F-F | 47.1 | 44.1 | 8.3 | — | 0.5 | 102 | 25 | 208.8 | 9.8 (297) |
| Synthesis example 20 | F-G | 46.1 | 43.8 | 9.6 | — | 0.5 | 76 | 38 | 196.1 | 8.5 (297) |
| Synthesis example 21 | F-H | 46.1 | 43.8 | 9.6 | — | 0.5 | Not detected | Not detected | 193.5 | 9.8 (230) |
| Synthesis example 22 | F-L | 54.1 | 42.9 | — | — | 3.0 | 55 | 12 | 252.1 | 19.8 (297) |

EXAMPLE 1

Using a tube extrusion machine for three components and three layers equipped with a multi-manifold die, a tube having an outside diameter of 8 mm and an inside diameter of 6 mm and comprising an outer layer made of the polyamide resin PA-C, an intermediate layer made of the fluorine-containing ethylenic polymer F-A and an inner layer made of an electrically conductive fluororesin F-J (commercially available conductive ETFE (Neoflon (registered trademark) ETFE-EP-610AS containing conductive carbon black), product of Daikin Industries, Ltd.) was molded continuously by feeding the fluorine-containing ethylenic polymer F-A and fluororesin F-J into each extruder so that they might form the intermediate layer and inner layer, respectively. The molding conditions and the results of evaluation of the tube obtained are shown in Table 4.

EXAMPLES 2 TO 13 AND COMPARATIVE EXAMPLES 1 TO 4

Multilayer tubes were molded in the same manner as in Example 1 except that the polymers and molding conditions used were as specified in Table 4 (Examples 2 to 13) and Table 5 (Comparative Examples 1 to 4). The molding conditions and the results of evaluation of the tubes obtained are shown in Table 4 (Examples 1 to 13) and Table 5 (Comparative Examples 1 to 4). Furthermore, in Example 10, the tube obtained was subjected to 30 minutes of heat treatment at 170° C. and then again measured for adhesion strength. As a result, an improvement in adhesion strength from 32.1 N/cm to 34.0 N/cm was found.

adhesion strength retention after soaking with the liquid agent was low and the interlayer adhesion strength between the polyamide-based resin composition/fluorine-containing ethylenic polymer showed a marked decrease. In Compara-

TABLE 4

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Outer layer resin | | PA-C | PA-D | PA-E | PA-F | PA-G | PA-C | PA-I | PA-G | PA-G | PA-G | PA-C | PA-C | PA-C |
| Intermediate layer resin | | F-A | F-A | F-A | F-A | F-A | F-C | F-C | F-B | F-B | F-B | F-E | F-L | F-L |
| Inner layer resin | | F-J | F-J | F-J | F-J | F-J | F-J | F-J | F-I | F-G | F-B | F-J | F-J | F-L |
| Cylinder temp. (° C.) | Outer layer | 245 | 245 | 245 | 245 | 240 | 245 | 240 | 245 | 245 | 245 | 245 | 245 | 245 |
| | Intermediate layer | 265 | 265 | 265 | 265 | 265 | 275 | 275 | 275 | 275 | 265 | 266 | 290 | 290 |
| | Inner layer | 330 | 330 | 330 | 330 | 330 | 330 | 330 | 300 | 275 | 330 | 330 | 330 | 290 |
| Die temperature (° C.) | | 260 | 260 | 260 | 260 | 260 | 260 | 260 | 260 | 260 | 260 | 260 | 260 | 260 |
| Tube line speed (m/min) | | 8.0 | 8.0 | 8.0 | 8.0 | 8.0 | 8.0 | 8.0 | 8.0 | 18.0 | 8.0 | 8.0 | 8.0 | 8.0 |
| Thickness of each layer (mm) | Outer layer | 0.76 | 0.75 | 0.75 | 0.74 | 0.75 | 0.75 | 0.76 | 0.75 | 0.75 | 0.76 | 0.76 | 0.75 | 0.75 |
| | Intermediate layer | 0.10 | 0.09 | 0.10 | 0.10 | 0.10 | 0.10 | 0.10 | 0.09 | 0.10 | 0.30 | 0.10 | 0.15 | 0.30 |
| | Inner layer | 0.15 | 0.15 | 0.16 | 0.15 | 0.15 | 0.15 | 0.16 | 0.15 | 0.15 | | 0.15 | 0.15 | |
| Appearance of tube inside and outside surfaces | | ○ | ○ | ○ | ○ | ○ | ○ | ○ | ○ | ○ | ○ | ○ | ○ | ○ |
| Adhesion strength (N/cm) | | 34 | 35.8 | 33.2 | 31.8 | 29.8 | 32.1 | 27.5 | 28.7 | 28.1 | 32.1 | 34.1 | 35.2 | 35.8 |
| Adhesion strength retention (%) after soaking with liquid agent | | 65.5 | 60.1 | 70.5 | 68.8 | 85.4 | 70.2 | 92.1 | 93.5 | 88.1 | 93.1 | 63.1 | 69.3 | 79.3 |
| Surface resistivity (MΩ/□) | | 0.05 | 0.05 | 0.04 | 0.05 | 0.05 | 0.04 | 0.05 | — | 0.10 | — | 0.05 | 0.05 | — |

TABLE 5

| | | Comparative example | | | |
|---|---|---|---|---|---|
| | | 1 | 2 | 3 | 4 |
| Outer layer resin | | PA-A | PA-B | PA-H | PA-J |
| Intermediate layer resin | | F-A | F-A | F-A | F-A |
| Inner layer resin | | F-J | F-J | F-J | F-J |
| Cylinder temperature (° C.) | Outer layer | 245 | 250 | 245 | 245 |
| | Intermediate layer | 265 | 265 | 265 | 265 |
| | Inner layer | 330 | 330 | 330 | 330 |
| Die temperature (° C.) | | 260 | 260 | 260 | 260 |
| Tube line speed (m/min) | | 8.0 | 8.0 | 8.0 | 8.0 |
| Thickness of each layer (mm) | Outer layer | 0.75 | 0.75 | 0.76 | 0.75 |
| | Intermediate layer | 0.10 | 0.09 | 0.10 | 0.10 |
| | Inner layer | 0.15 | 0.15 | 0.14 | 0.15 |
| Appearance of tube inside and outside surfaces | | ○ | ○ | ○ | ○ |
| Adhesion strength (N/cm) | | 36.5 | 37.2 | 35.5 | 13.4 |
| Adhesion strength retention (%) after soaking with liquid agent | | 31.2 | 35.6 | 35.1 | 53.1 |
| Surface resistivity (MΩ/□) | | 0.05 | 0.05 | 0.05 | 0.05 |

In Comparative Examples 1 to 4, where the polyamide-based resins used were low in contents of hydroxyl groups, carboxyl groups, ester groups and sulfonamide groups, the tive Examples 1 and 2, the initial adhesion strength was high but the adhesion strength after soaking with the liquid agent showed a marked decrease. In Comparative Example 3, the polyamide-based resin composition PA-H contained 1.4 equivalent percent, relative to the amide groups, of ether groups but contained only hydroxyl groups, out of the above-specified four functional group species, at an insufficient level, so that the interlayer adhesion strength showed a marked decrease after soaking with the liquid agent. On the other hand, in Comparative Example 4, the polyamide-based resin composition used had a high plasticizer content, so that, after soaking with the liquid agent, a large amount of a white, presumably plasticizer-derived powder was observed on the outer layer surface of the tube. In addition, no satisfactory initial adhesion strength was attained, and the retention percentage was low, hence the adhesion strength after soaking with the liquid agent was very low. On the contrary, in Examples 1 to 11, the initial adhesion strength and the adhesion strength retention after soaking with the liquid agent were sufficiently high; an adhesion strength of not lower than 20 N/cm was retained even after soaking. In Examples 5 and 7 to 10, in particular, where the aromatic ring-bound sulfonamide group content was sufficient, the retention percentage was very high. In Example 9, even when the tube line speed was increased, good products could be obtained. The fluorine-containing ethylenic polymer F-I is a commercially available ETFE (Neoflon (registered trademark) ETFE EP-610, product of Daikin Industries, Ltd.) and F-J is a commercially available conductive ETFE (Neoflon (registered trademark) ETFE EP-610AS containing conductive carbon black; product of Daikin Industries, Ltd.).

EXAMPLES 14 TO 18 AND COMPARATIVE EXAMPLES 5 AND 6

Multilayer tubes, 8 mm in outside diameter and 6 mm in inside diameter, were molded using a tube extrusion machine for two components and two layers (Examples 14 to 17, Comparative Examples 5 and 6) or a tube extrusion machine for four components and four layers (Example 18) each equipped with a multi-manifold die. The molding conditions and the results of evaluation of the tubes obtained are shown in Table 6.

diameter of 12 mm and a core diameter of 8.5 mm, cylindrical molded articles with a diameter of 40 mm and a height of 300 mm were obtained. The molding conditions and the results of evaluation of the molded articles obtained are shown in Table 7. The adhesion strength was measured along the longitudinal direction of the cylinder side.

TABLE 7

|  | Example 19 | Comparative Example 7 |
|---|---|---|
| Outer layer resin | PA-C | PA-A |
| Inner layer resin | F-B | F-B |

TABLE 6

|  |  | Example | | | | | Comparative example | |
|---|---|---|---|---|---|---|---|---|
|  |  | 14 | 15 | 16 | 17 | 18 | 5 | 6 |
| Outer layer resin | | PA-C | PA-C | PA-C | PA-C | PA-G | PA-C | PA-C |
| Intermediate layer resin | | F-B | F-D | F-F | F-G | F-B | F-H | F-H |
| Inner layer resin | | — | — | — | — | F-I | — | — |
| Innermost layer resin | | — | — | — | — | F-J | — | — |
| Cylinder temp. (° C.) | Outer layer | 245 | 245 | 245 | 245 | 245 | 245 | 245 |
|  | Intermediate layer | 275 | 250 | 275 | 275 | 280 | 280 | 350 |
|  | Inner layer | — | — | — | — | 300 | — | — |
|  | Innermost layer | — | — | — | — | 325 | — | — |
| Die temperature (° C.) | | 260 | 250 | 260 | 260 | 250 | 260 | 260 |
| Tube line speed (m/min) | | 8.0 | 8.0 | 8.0 | 8.0 | 8.0 | 8.0 | 8.0 |
| Thickness of each layer (mm) | Outer layer | 0.71 | 0.69 | 0.69 | 0.69 | 0.75 | 0.70 | 0.70 |
|  | Intermediate layer | 0.30 | 0.31 | 0.30 | 0.31 | 0.10 | 0.30 | 0.30 |
|  | Outer layer | — | — | — | — | 0.10 | — | — |
|  | Outermost layer | — | — | — | — | 0.05 | — | — |
| Appearance of tube inside and outside surfaces | | ○ | ○ | ○ | ○ | ○ | ○ | X |
| Adhesion strength (N/cm) | | 33.1 | 29.5 | 29.5 | 29.6 | 33.5 | 12.5 | (**) |
| Adhesion strength retention (%) after soaking with liquid agent | | 75.1 | 71.1 | 71.1 | 72.3 | 90.1 | 30 | Not determined |
| Surface resistivity (MΩ/□) | | — | — | 0.08 | 0.01 | 0.10 | — | — |

(**)Manual interlayer separation was feasible with ease.

In each of Examples 14 to 17, the adhesion strength after soaking with the liquid agent was sufficiently great, revealing that the adhesion between the polyamide-based resin composition layer and fluorine-containing ethylenic polymer layer was significantly improved. In Example 18, the adhesion strength of the multilayer molding as a whole was also found to be sufficient. On the contrary, in Comparative Examples 5 and 6, the fluorine-containing ethylenic polymer did not have any other carbonyl groups than the amide groups and, therefore, the interlayer adhesion strength between the layers made of that polymer and the polyamide-based resin composition was unsatisfactory. When, in Comparative Example 6, the molding temperature was raised, appearance defects due to foaming and the like and the interlayer adhesion strength rather decreased.

EXAMPLE 19 AND COMPARATIVE EXAMPLE 7

Molding of Multilayer Blown Cylinders

Using a multilayer blow molding machine for two components and two layers equipped with a die having a die TABLE 7-continued

|  |  | Example 19 | Comparative Example 7 |
|---|---|---|---|
| Die temperature (° C.) | | 260 | 260 |
| Cylinder temperature (° C.) | Outer layer | 250 | 250 |
|  | Inner layer | 275 | 275 |
| Thickness of each layer (mm) | Outer layer | 0.72 | 0.71 |
|  | Inner layer | 0.30 | 0.30 |
| Appearance of tube inside and outside surfaces | | ○ | ○ |
| Adhesion strength (N/cm) | | 24.5 | 25.8 |
| Adhesion strength retention (%) after soaking with liquid agent | | 70.5 | 30.2 |

EXAMPLES 20 TO 23 AND REFERENCE EXAMPLES 1 to 4

The multilayer tubes respectively specified in Table 8 were measured for cold temperature impact resistance at −40° C. according to the method described in SAE J 2260. The results are shown in Table 8 in terms of the number of specimens showing a burst pressure of not more than 75% of that before the falling ball test. In the table, F-K stands for a commercially available adhesive for multilayer tube manufacture (Neoflon (registered trademark) ETFE EA-LR43 (blend of ETFE and nylon 12), product of Daikin Industries, Ltd.).

were each measured for permeation rate at 60° C. using Fuel CM15 (toluene/isooctane/methanol=17/17/6, in a volume ratio), Fuel CE10 (toluene/isooctane/ethanol=9/9/2, in a volume ratio) or Fuel C (toluene/isooctane=1/1, in a volume ratio). The results of evaluation of each tube are shown in Table 9 or Table 10. The calculated value Pm of permeation rate in the table was obtained by substituting the permeation rate values Pi of the respective constituent layers measured under the same conditions and the volume fraction values $\Phi i$ of the constituent layers in the laminate for Pi and $\Phi i$ in the equation $1/Pm = \Sigma(\Phi i/Pi)$.

TABLE 8

|  |  | Example |  |  |  | Reference example |  |  |  |
|---|---|---|---|---|---|---|---|---|---|
|  |  | 20 | 21 | 22 | 23 | 1 | 2 | 3 | 4 |
| Outer layer resin |  | PA-C | PA-G | PA-C | PA-G | PA-A | PA-A | PA-C | PA-G |
| Intermediate layer resin |  | F-A | F-A | F-B | F-B | F-A | F-K | F-K | F-K |
| Inner layer resin |  | F-J | F-J | — | F-I | F-J | F-J | F-J | F-J |
| Innermost layer resin |  | — | — | — | F-J | — | — | — | — |
| Thickness of each layer (mm) | Outer layer | 0.76 | 0.75 | 0.71 | 0.75 | 0.75 | 0.75 | 0.75 | 0.75 |
|  | Intermediate layer | 0.10 | 0.10 | 0.30 | 0.10 | 0.10 | 0.10 | 0.10 | 0.10 |
|  | Inner layer | 0.15 | 0.15 | — | 0.10 | 0.15 | 0.15 | 0.15 | 0.1.5 |
|  | Innermost layer | — | — | — | 0.05 | — | — | — | — |
| Cold temperature impact resistance |  | 0/10 | 0/10 | 0/10 | 0/10 | 0/10 | 0/10 | 5/10 | 10/10 |

As shown in Reference Examples 2 to 4, there is a general tendency toward decrease in cold temperature impact resistance with the increase in plasticizer addition level in the polyamide-based resin composition. Nevertheless, it was found that when the specific polyamide-based resin composition and fluorine-containing ethylenic polymer are combined in accordance with the present invention, the cold temperature impact resistance will not deteriorate even when the plasticizer content is high.

EXAMPLES 24 TO 32 AND COMPARATIVE EXAMPLES 8 TO 10

Multilayer tubes were molded in the same manner as in Example 1 except that the polymers and molding conditions specified in Table 9 (Examples 24 to 32) and Table 10 (Comparative Examples 8 to 10). The single layer tubes

EXAMPLES 33 TO 40

Tubes, 8 mm in outside diameter and 6 mm in inside diameter, were molded using the polymers and molding conditions shown in Table 11 (Examples 33 to 40) and using a tube extruding machine for a single layer. The single layer tubes were each measured for permeation rate in the same manner as in Examples 24 to 32. The evaluation results for each tube are shown in Table 11.

TABLE 9

|  |  | Example |  |  |  |  |  |  |  |  |
|---|---|---|---|---|---|---|---|---|---|---|
|  |  | 24 | 25 | 26 | 27 | 28 | 29 | 30 | 31 | 32 |
| Outer layer resin |  | PA-K | PA-L | PA-M | PA-K | PA-L | PA-M | PA-K | PA-L | PA-M |
| Intermediate layer resin |  |  | F-A |  |  | F-B |  |  | F-G |  |
| Inner layer resin |  |  | F-J |  |  | F-J |  |  | Not used |  |
| Cylinder temperature (° C.) | Outer layer |  | 245 |  |  | 245 |  |  | 245 |  |
|  | Intermediate layer |  | 265 |  |  | 265 |  |  | 265 |  |
|  | Inner layer |  | 330 |  |  | 330 |  |  | Not used |  |
| Die temperature (° C.) |  |  | 280 |  |  | 280 |  |  | 280 |  |
| Tube line speed (m/min) |  |  | 8 |  |  | 8 |  |  | 8 |  |
| Thickness of each layer (mm) | Outer layer |  | 0.75 |  |  | 0.75 |  |  | 0.75 |  |
|  | Intermediate layer |  | 0.1 |  |  | 0.1 |  |  | 0.25 |  |
|  | Inner layer |  | 0.15 |  |  | 0.15 |  |  | Not used |  |
| CM15 | Actually measured permeation rate (g/m²/day) | 50 | 40 | 30 | 35 | 25 | 20 | 40 | 30 | 25 |
|  | Calculated permeation rate (g/m²/day) | 58 | 58 | 59 | 48 | 49 | 49 | 52 | 53 | 53 |
| CE10 | Actually measured | 25 | 20 | 15 | 20 | 10 | 7 | 25 | 12 | 10 |

TABLE 9-continued

|  |  | Example | | | | | | | | |
|---|---|---|---|---|---|---|---|---|---|---|
|  |  | 24 | 25 | 26 | 27 | 28 | 29 | 30 | 31 | 32 |
|  | permeation rate (g/m²/day) Calculated permeation rate (g/m²/day) | 27 | 28 | 28 | 22 | 23 | 23 | 30 | 30 | 31 |
| C | Actually measured permeation rate (g/m²/day) | 11 | 10 | 10 | 5 | 5 | 5 | 7 | 7 | 6 |
|  | Calculated permeation rate (g/m²/day) | 8 | 8 | 8 | 4 | 4 | 4 | 6 | 6 | 6 |

TABLE 10

|  |  | Comparative example | | |
|---|---|---|---|---|
|  |  | 8 | 9 | 10 |
| Outer layer resin |  | PA-A | PA-A | PA-A |
| Intermediate layer resin |  | F-A | F-B | F-G |
| Inner layer resin |  | F-J | F-J | Not used |
| Cylinder temperature (° C.) | Outer layer | 245 | 245 | 245 |
|  | Intermediate layer | 265 | 265 | 265 |
|  | Inner layer | 330 | 330 | Not used |
| Die temperature (° C.) |  | 280 | 280 | 280 |
| Tube line speed (m/min) |  | 8 | 8 | 8 |
| Thickness of each layer (mm) | Outer layer | 0.75 | 0.75 | 0.75 |
|  | Intermediate layer | 0.1 | 0.1 | 0.25 |
|  | Inner layer | 0.15 | 0.15 | Not used |
| CM15 | Actually measured permeation rate (g/m²/day) | 70 | 50 | 55 |
|  | Calculated permeation rate (g/m²/day) | 57 | 48 | 52 |
| CE10 | Actually measured permeation rate (g/m²/day) | 40 | 25 | 30 |
|  | Calculated permeation rate (g/m²/day) | 26 | 22 | 29 |
| C | Actually measured permeation rate (g/m²/day) | 9 | 5 | 6 |
|  | Calculated permeation rate (g/m²/day) | 8 | 4 | 6 |

TABLE 11

|  |  | Example | | | | | | | |
|---|---|---|---|---|---|---|---|---|---|
|  |  | 33 | 34 | 35 | 36 | 37 | 38 | 39 | 40 |
| Resin |  | F-A | F-B | F-G | F-J | PA-A | PA-K | PA-L | PA-M |
| Cylinder temperature (° C.) |  | 245 | 265 | 265 | 320 | 245 | 245 | 245 | 245 |
| Die temperature (° C.) |  | 245 | 265 | 265 | 280 | 245 | 245 | 245 | 245 |
| Tube line speed (m/min) |  | 2 | 2 | 2 | 2 | 10 | 10 | 10 | 10 |
| Thickness (mm) |  | 1 | 1 | 1 | 1 | 1 | 1 | 1 | 1 |
| CM15 | Permeation rate (g/m²/day) | 33 | 15 | 14 | 12 | 500 | 560 | 645 | 750 |
| CE10 | Permeation rate (g/m²/day) | 19 | 8 | 9 | 6 | 140 | 170 | 200 | 230 |
| C | Permeation rate (g/m²/day) | 11 | 4 | 5 | 3 | 12 | 14 | 16 | 19 |

From the Examples and Comparative Examples, it can be seen that the plasticizer contained in the outer layer constituent polyamide-based resin composition contributes toward reducing the liquid agent permeability of the multilayer tube as a whole. In addition, the liquid agent permeability is reduced to a greater extent as the plasticizer content increases. In particular when the liquid agent contains a lower alcohol, the effect is significant.

INDUSTRIAL APPLICABILITY

The multilayer resin molding of the present invention, which has the constitution described above, can retain, even after soaking with a liquid agent, its interlayer adhesion strength, in particular the adhesion strength between the polyamide-based resin composition layer and the fluorine-containing ethylenic polymer layer. Furthermore, by using a specific polymer as the fluorine-containing ethylenic polymer, even when such a fluororesin is used as an inner layer, it becomes possible to satisfactorily maintain the adhesion strength of the multilayer resin molding as a whole even in a liquid agent soaking environment. Therefore, it is possible, by using a polyamide-based resin composition as an outer layer, to provide tubes and other molded articles with good mechanical properties and a high level of resistance to heat, chemical substances and other external environmental factors and, by forming a fluororesin layer as an innermost layer, it is possible to produce excellent molded articles improved in interlayer adhesion strength retention by coextrusion molding. This is very advantageous from the industrial viewpoint while markedly reducing the permeability of the molded articles against solvents, fuels, etc.

What is claimed is:

1. A laminated resin molding
which comprises a layer (A) comprising a polyamide-based resin composition and a layer (B) laminated to said layer (A),
said layer (B) comprising a fluorine-containing ethylenic polymer having a carbonyl group, and
said polyamide-based resin composition having a functional group, in addition to an amide group, selected from the group consisting of hydroxyl group, carboxyl group, ester group and sulfonamide group in a total amount of 0.05 to 80 equivalent percent relative to the amide group.

2. The laminated resin molding according to claim 1,
wherein the polyamide-based resin composition has a functional group selected from the group consisting of hydroxyl group, carboxyl group, ester group and sulfonamide group in a total amount of 1 to 70 equivalent percent relative to the amide group.

3. The laminated resin molding according to claim 2,
wherein the polyamide-based resin composition has a functional group selected from the group consisting of hydroxyl group, carboxyl group, ester group and sulfonamide group in a total amount of 1 to 50 equivalent percent relative to the amide group.

4. The laminated resin molding according to claim 1,
wherein the polyamide-based resin composition contains a plasticizer having at least one functional group species selected from the group consisting of hydroxyl group, carboxyl group, ester group and sulfonamide group in an amount of 5 to 30% by weight relative to the whole polyamide-based resin composition.

5. The laminated resin molding according to claim 1,
wherein the polyamide-based resin composition has at least a sulfonamide group in addition to the amide group.

6. The laminated resin molding according to claim 5,
wherein the sulfonamide group is a sulfonamide group directly bound to an aromatic ring.

7. The laminated resin molding according to claim 1,
wherein the polyamide-based resin composition comprises at least one member selected from the group consisting of nylon 6, nylon 66, nylon 11, nylon 12, nylon 610, nylon 612, nylon 6/66, nylon 66/12, nylon 6/polyester copolymers, nylon 6/polyether copolymers, nylon 12/polyester copolymers, nylon 12/polyether copolymers, and blends of these.

8. The laminated resin molding according to claim 7,
wherein the main component of the polyamide-based resin composition is nylon 11, nylon 12, nylon 610, nylon 612, a nylon 6/polyether copolymer or a nylon 12/polyether copolymer.

9. The laminated resin molding according to claim 1,
wherein the carbonyl group content of the fluorine-containing ethylenic polymer having the carbonyl group is 3 to 1,000 groups, in total, per $1 \times 10^6$ main chain carbon atoms.

10. The laminated resin molding according to claim 1,
wherein the carbonyl group of the fluorine-containing ethylenic polymer having the carbonyl group is derived from a peroxide.

11. The laminated resin molding according to claim 1,
wherein the layer (B) comprising the fluorine-containing ethylenic polymer having the carbonyl group is one formed by melt extrusion of a fluorine-containing ethylenic polymer having a carbonate group and/or a carbonyl halide group.

12. The laminated resin molding according to claim 1,
wherein the layer (B) comprising the fluorine-containing ethylenic polymer having the carbonyl group comprises a fluorine-containing ethylenic polymer having at least one carbonyl group species selected from the group consisting of carbonate group, carbonyl halide group and carboxyl group in a total amount of 3 to 1,000 groups per $1 \times 10^6$ main chain carbon atoms.

13. The laminated resin molding according to claim 1,
wherein the fluorine-containing ethylenic polymer having the carbonyl group is one resulting from polymerization of at least tetrafluoroethylene and ethylene.

14. The laminated resin molding according to claim 1,
wherein the fluorine-containing ethylenic polymer having the carbonyl group is one resulting from polymerization of at least tetrafluoroethylene and a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms.

15. The laminated resin molding according to claim 1,
wherein the fluorine-containing ethylenic polymer having the carbonyl group is a copolymer resulting from polymerization of at least the following a, b and c:
a. 20 to 90 mole percent of tetrafluoroethylene;
b. 10 to 80 mole percent of ethylene;
c. 1 to 70 mole percent of a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms.

16. The laminated resin molding according to claim 1,
wherein the fluorine-containing ethylenic polymer having the carbonyl group is a copolymer resulting from polymerization of at least the following d, e and f:
d. 15 to 60 mole percent of vinylidene fluoride;
e. 35 to 80 mole percent of tetrafluoroethylene;
f. 5 to 30 mole percent of hexafluoropropylene.

17. The laminated resin molding according to claim 1,
wherein the fluorine-containing ethylenic polymer having the carbonyl group has a melting point of 160 to 270° C.

18. The laminated resin molding according to claim 1, wherein said layer (B) is electrically conductive.

19. The laminated resin molding according to claim 1, wherein an initial interlayer adhesion strength between said layer (A) and said layer (B) is not less than 20 N/cm.

20. The laminated resin molding according to claim 19, wherein an interlayer adhesion strength retention percentage between said layer (A) and said layer (B) is not less than 40% after soaking with a pseudofuel comprising toluene/isooctane/methanol=17/17/6, in a volume ratio.

21. The laminated resin molding according to claim 1, wherein said layer (B) has a thickness of less than 0.5 mm.

22. The laminated resin molding according to claim 1, wherein said layer (B) is further laminated to a layer (C), said layer (C) comprising a fluororesin and containing or not containing an electrically conductive material.

23. The laminated resin molding according to claim 22, wherein the layer (C) comprising the fluororesin and not containing the electrically conductive material is further laminated to a layer (D), said layer (D) comprising a fluororesin and containing an electrically conductive material.

24. The laminated resin molding according to claim 22, wherein the thickness of said layer (B) is less than 1.5 times the thickness of said layer (C) laminated thereto or, in case that said layer (D) is further laminated to said layer (C), less than 1.5 times the total thickness of said layer (C) and layer (D).

25. A laminated resin molding which comprises a layer (I) comprising a polyamide-based resin composition and a layer (II) laminated to said layer (I), said polyamide-based resin composition containing a plasticizer having at least one functional group species selected from the group consisting of hydroxyl group, carboxyl group, ester group and sulfonamide group, said layer (II) comprising a fluorine-containing ethylenic polymer having a carbonyl group, and a permeation rate of the molding against a liquid agent, in case that the liquid agent is soaked with the layer (II) side, being lower than a calculated permeation rate Pm defined by the following equation:

$$1/Pm = \Sigma(\Phi i/Pi)$$

in the formula, $\Phi i$ is a volume fraction of the $i^{th}$ layer of the laminated resin molding and $Pi$ is the permeation rate of the resin layer constituting the $i^{th}$ layer of the laminated resin molding, when tested as a single-layer, against the liquid agent.

26. The laminated resin molding according to claim 25, which contains 5 to 30% by weight of the plasticizer relative to the polyamide-based resin composition.

27. The laminated resin molding according to claim 26, which contains 8 to 25% by weight of the plasticizer relative to the polyamide-based resin composition.

28. The laminated resin molding according to claim 25, wherein the plasticizer has a sulfonamide group.

29. The laminated resin molding according to claim 28, wherein the plasticizer has a sulfonamide group directly bound to an aromatic ring.

30. The laminated resin molding according to claim 25, wherein the polyamide-based resin composition comprises at least one member selected from the group consisting of nylon 6, nylon 66, nylon 11, nylon 12, nylon 610, nylon 612, nylon 6/66, nylon 66/12, nylon 6/polyester copolymers, nylon 6/polyether copolymers, nylon 12/polyester copolymers, nylon 12/polyether copolymers, and blends of these.

31. The laminated resin molding according to claim 25, wherein the fluorine-containing ethylenic polymer having the carbonyl group is a fluorine-containing ethylenic polymer having a carbonate group and/or a carbonyl halide group.

32. The laminated resin molding according to claim 25, wherein the fluorine-containing ethylenic polymer having the carbonyl group is one resulting from polymerization of at least tetrafluoroethylene and ethylene.

33. The laminated resin molding according to claim 25, wherein the fluorine-containing ethylenic polymer having the carbonyl group is one resulting from polymerization of at least tetrafluoroethylene and a compound represented by the general formula:

$$CF_2=CF-Rf_1$$

in the formula, $Rf^1$ represents $CF_3$ or $ORf^2$ and $Rf^2$ represents a perfluoroalkyl group containing 1 to 5 carbon atoms.

34. The laminated resin molding according to claim 25, wherein the fluorine-containing ethylenic polymer having the carbonyl group is a copolymer resulting from polymerization of at least the following a, b and c:
 a. 20 to 90 mole percent of tetrafluoroethylene;
 b. 10 to 80 mole percent of ethylene;
 c. 1 to 70 mole percent of a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms.

35. A multilayer molded article which comprises the laminated resin molding according to claim 1.

36. The multilayer molded article according to claim 35 which is a molded article selected from the group consisting of films, hoses, tubes, bottles and tanks.

37. The multilayer molded article according to claim 36 which is an automotive fuel piping tube or hose or tank each having an at least two-layer structure comprising, as an outer layer, the layer (A) comprising the polyamide-based resin composition and, as an inner layer, the layer (B) comprising the fluorine-containing ethylenic polymer having the carbonyl group.

38. The multilayer molded article according to claim 36 which is an automotive fuel piping tube or hose or tank each having an at least three-layer structure comprising, as an outer layer, the layer (A) comprising the polyamide-based resin composition; as an intermediate layer, the layer (B) comprising the fluorine-containing ethylenic polymer having the carbonyl group; and, as an inner layer, the layer (C) comprising the fluororesin and containing or not containing an electrically conductive material.

39. The multilayer molded article according to claim 36 which is an automotive fuel piping tube or hose or tank each having an at least four-layer structure comprising, as an outer layer, the layer (A) comprising the polyamide-based resin composition; as an intermediate layer, the layer (B) comprising the fluorine-containing ethylenic polymer having the carbonyl group; as an inner layer, the layer (C) comprising the fluororesin and not containing the electrically conductive material; and, as an innermost layer, the layer (D) comprising the fluororesin and containing the electrically conductive material.

40. The multilayer molded article according to claim 37, wherein a burst pressure as found in a burst test carried out after a falling ball test for an automotive fuel tube carried out at −40° C. as indicated in SAE J 2260 is above 75% of a burst pressure tested before the falling ball test.

41. A laminated resin molding for use of a liquid agent which comprises
   a layer (A) formed by melt extrusion of a polyamide-based resin composition and
   a layer (B) formed by melt extrusion of a fluorine-containing ethylenic polymer having a carbonyl group and laminated to said layer (A),
   said layer (A) being one formed by melt extrusion of the polyamide-based resin composition having a functional group, in addition to an amide group, selected from the group consisting of hydroxyl group, carboxyl group, ester group and sulfonamide group in a total amount of 1 to 50 equivalent percent relative to the amide group,
   said layer (B) being one formed by melt extrusion of the fluorine-containing ethylenic polymer having the carbonyl group, and
   said fluorine-containing ethylenic polymer having the carbonyl group being the one having a carbonate group and/or a carbonyl halide group in a total amount of 3 to 1,000 groups per $1 \times 10^6$ main chain carbon atoms and having a melting point of 160 to 270° C.

42. A production method of a multilayer molded article having an at least two-layer structure comprising
   a layer (A) formed by melt extrusion of a polyamide-based resin composition having a functional group, in addition to an amide group, selected from the group consisting of hydroxyl group, carboxyl group, ester group and sulfonamide group in a total amount of 0.05 to 80 equivalent percent relative to the amide group, and
   a layer (B) formed by melt extrusion of a fluorine-containing ethylenic polymer having 3 to 1,000 carbonyl groups, in total, per $1 \times 10^6$ main chain carbon atoms and laminated to said layer (A),
   which comprises molding a resin laminate having said layer (A) and said layer (B) by melt extrusion to form a multilayer molding and subjecting the thus-formed multilayer molding to heat treatment for 0.01 to 10 hours at a temperature lower than the lowest melting point among melting points of the resins constituting said molding to obtain the multilayer molded article.

43. A method of reducing permeability, against a liquid agent, of a laminated resin molding comprising a layer (I) and a layer (II) laminated to said layer (I),
   which comprises incorporating, in said layer (I), a placticizer having a functional group selected from the group consisting of hydroxyl group, a carboxyl group, ester group and sulfonamide group,
   said layer (I) comprising a polyamide-based resin composition, and
   said layer (II) comprising a fluorine-containing ethylenic polymer having a carbonyl group.

44. A production method of a laminated resin molding having a low liquid agent permeability and comprising a layer (I) and a layer (II) laminated to said layer (I),
   which comprises incorporating, in a polyamide-based resin composition constituting said layer (I), a plasticizer having a functional group selected from the group consisting of hydroxyl group, carboxyl group, ester group and sulfonamide group and subjecting the resulting composition to lamination,
   said layer (I) comprising the polyamide-based resin composition, and
   said layer (II) comprising a fluorine-containing ethylenic polymer having a carbonyl group.

* * * * *